United States Patent

Saga et al.

[11] Patent Number: 5,862,510
[45] Date of Patent: Jan. 19, 1999

[54] NAVIGATION DEVICE

[75] Inventors: Ikuo Saga; Shigeki Nakane, both of Aichi; Masako Ohta; Kazuhiro Yokouchi, both of Tokyo, all of Japan

[73] Assignees: Mitsubishi Jidosha Kogyo Kabushiki Kaisha; Mitsubishi Denki Kabushiki Kaisha, both of Tokyo, Japan

[21] Appl. No.: 706,710

[22] Filed: Sep. 6, 1996

[30] Foreign Application Priority Data

Sep. 6, 1995 [JP] Japan .................................... 7-229243

[51] Int. Cl.$^6$ .................................................. G06F 165/00
[52] U.S. Cl. .......................... 701/211; 701/208; 701/117; 340/990; 340/995
[58] Field of Search .................................... 701/117, 200, 701/207, 208, 209, 211; 73/178 R; 340/988, 990, 995, 905

[56] References Cited

U.S. PATENT DOCUMENTS

| | | | |
|---|---|---|---|
| 5,257,023 | 10/1993 | Furuya | 701/117 |
| 5,313,200 | 5/1994 | Sone | 701/117 |
| 5,523,950 | 6/1996 | Peterson | 701/117 |
| 5,583,494 | 12/1996 | Mizutani et al. | 701/207 |
| 5,694,122 | 12/1997 | Nakada | 701/211 |
| 5,712,632 | 1/1998 | Nishimura | 701/209 |

FOREIGN PATENT DOCUMENTS 440596  2/1992  Japan .

*Primary Examiner*—Gary Chin

[57] ABSTRACT

A navigation device comprises a traffic information receiving means (103) for receiving traffic information, and a display form controlling unit (107) for displaying a traffic-jam indicating line along a road in a traffic jam on a road map displayed on a display device (106), and for changing display forms, such as the colors or widths, of either roads or traffic-jam indicating lines on the road map on-screen when the display form controlling unit determines from the traffic information received that a number of links each of which are respectively connecting two nodes such as intersections and includes a congested road section is equal to or more than a predetermined number or when the scale of the road map displayed on the display device is smaller than a predetermined scale.

16 Claims, 28 Drawing Sheets

R1 (EXPRESSWAY)
: BLUE (3 DOTS)
R2 (NATIONAL ROAD)
: RED (3 DOTS)
R3 (PREFECTURAL ROAD)
: GREEN (3 DOTS)
R4 (OTHER ROAD)
: OCHER (1 DOT)

J1-J3 (TRAFFIC-JAM
INDICATING LINE)
: DARK RED (3 DOTS)

B (BACKGROUND)
: LIGHT OCHER

R1 (EXPRESSWAY)
: BLUE (1 DOT)
R2 (NATIONAL ROAD)
: RED (1 DOT)
R3 (PREFECTURAL ROAD)
: GREEN (1 DOT)
R4 (OTHER ROAD)
: OCHER (1 DOT)

J1-J5 (TRAFFIC-JAM
INDICATING LINE)
: DARK RED (3 DOTS)

B (BACKGROUND)
: LIGHT OCHER

R1 (EXPRESSWAY)
: BLUE (3 DOTS)
R2 (NATIONAL ROAD)
: RED (3 DOTS)
R3 (PREFECTURAL ROAD)
: GREEN (3 DOTS)
R4 (OTHER ROAD)
: OCHER (1DOT)

J1-J3 (TRAFFIC-JAM
INDICATING LINE)
: DARK RED (3 DOTS)

B (BACKGROUND)
: LIGHT OCHER

R1 (EXPRESSWAY)
: BLUE (3 DOTS)
R2 (NATIONAL ROAD)
: RED (3 DOTS)
R3 (PREFECTURAL ROAD)
: GREEN (3 DOTS)
R4 (OTHER ROAD)
: OCHER (1DOT)

J1-J5 (TRAFFIC-JAM
INDICATING LINE)
: DARK RED (3 DOTS)

B (BACKGROUND)
: LIGHT OCHER

R1 (EXPRESSWAY)
 : BLUE (3 DOTS)
R2 (NATIONAL ROAD)
 : RED (3 DOTS)
R3 (PREFECTURAL ROAD)
 : GREEN (3 DOTS)
R4 (OTHER ROAD)
 : OCHER (1 DOT)

J1–J5 (TRAFFIC-JAM
 INDICATING LINE)
 : DARK RED (3 DOTS)

B (BACKGROUND)
 : LIGHT OCHER

R1 (EXPRESSWAY)
 : BLUE (1 DOT)
R2 (NATIONAL ROAD)
 : RED (1 DOT)
R3 (PREFECTURAL ROAD)
 : GREEN (1 DOT)
R4 (OTHER ROAD)
 : OCHER (1 DOT)

J1–J7 (TRAFFIC-JAM
 INDICATING LINE)
 : DARK RED (3 DOTS)

B (BACKGROUND)
 : LIGHT OCHER

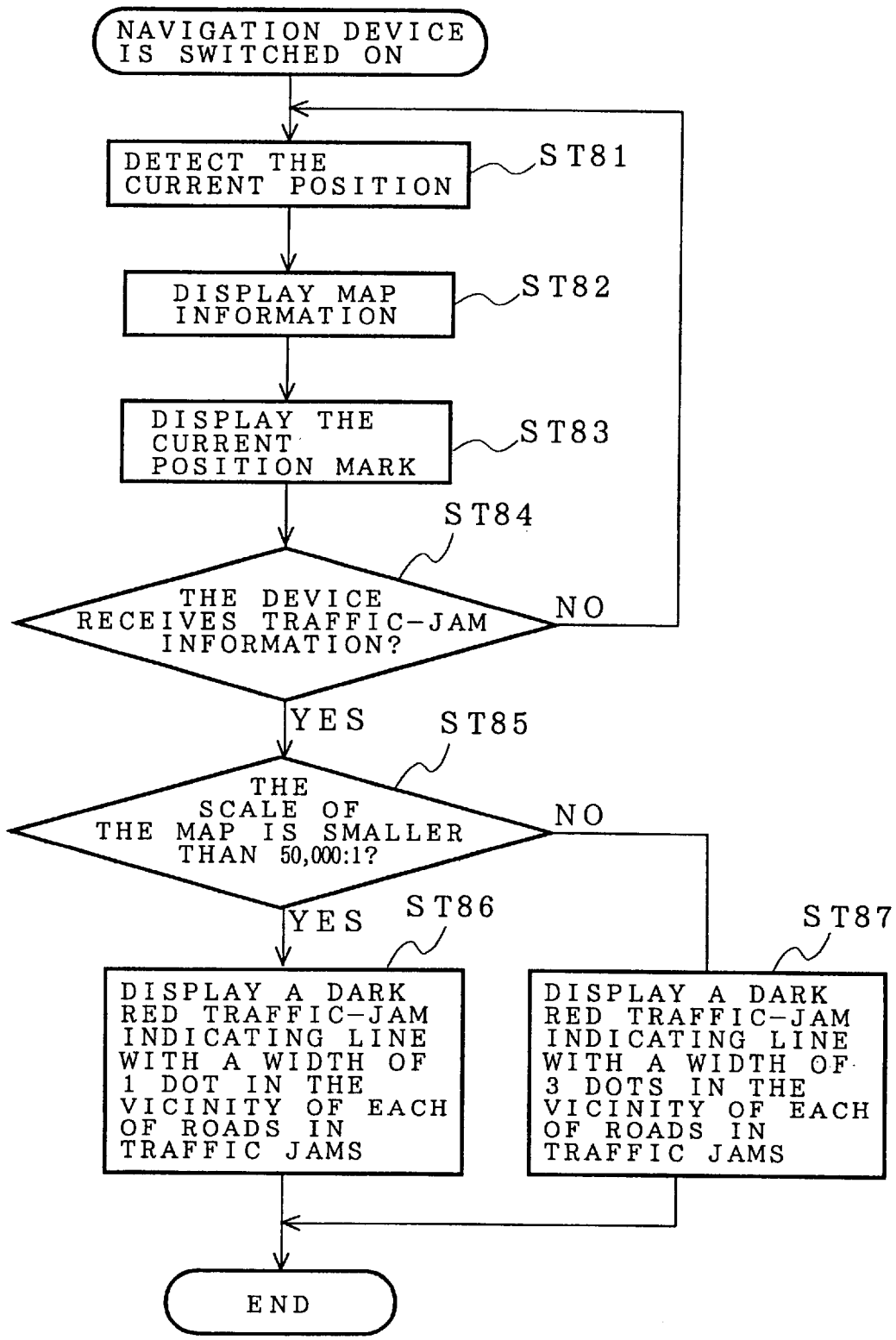

R1 (EXPRESSWAY)
          : BLUE (3 DOTS)
R2 (NATIONAL ROAD)
          : RED (3 DOTS)
R3 (PREFECTURAL ROAD)
          : GREEN (3 DOTS)
R4 (OTHER ROAD)
          : OCHER (1 DOT)

J1-J5 (TRAFFIC-JAM
       INDICATING LINE)
       : DARK RED (3 DOTS)

B (BACKGROUND)
       : LIGHT OCHER

R1 (EXPRESSWAY)
          : BLUE (3 DOTS)
R2 (NATIONAL ROAD)
          : RED (3 DOTS)
R3 (PREFECTURAL ROAD)
          : GREEN (3 DOTS)
R4 (OTHER ROAD)
          : OCHER (1 DOT)

J1-J7 (TRAFFIC-JAM
       INDICATING LINE)
       : DARK RED (1 DOTS)

B (BACKGROUND)
       : LIGHT OCHER

NAVIGATION DEVICE

BACKGROUND OF THE INVENTION

1. Field of the Invention

The present invention relates to a navigation device which can be mounted on a vehicle such as a motor vehicle, for displaying the current position of the vehicle and traffic information received by the vehicle on a map displayed on the screen of a display device.

2. Description of the Prior Art

Referring now to FIG. 26, it illustrates a block diagram showing the structure of a prior art navigation device disclosed in, for example, Japanese Patent Application Laying Open (KOKAI) No. 4-40596. In the figure, reference numeral 1 denotes a display means such as a cathode ray tube display or a liquid crystal display, for displaying display data such as a map and the current position of a vehicle comprising such the prior art navigation device, 2 denotes a map storing means such as a compact disc or a semiconductor memory, for storing data on a map to be displayed on the screen of the display means 1, 3 denotes a selection switch for inputting various instructions provided by a driver, and 4 denotes a scale setting means for setting the scale of a map to be displayed on the screen of the display means 1 in accordance with an user's operation of the selection switch 3.

Furthermore, reference numeral 5 denotes a current position estimating means for estimating the current position of the vehicle. The current position estimating means is adapted to estimate the current position of the vehicle with high accuracy by using self-contained dead reckoning navigation with which the current position of the vehicle can be estimated on the basis of map data stored in the map storing means 2 and measured data by various sensors mounted on the vehicle, such as a magnetic sensor and a wheel speed sensor, and satellite navigation with which the current position of the vehicle can be estimated on the basis of data included in received radio waves delivered by satellites, in combination. Reference numeral 6 denotes a map reading means for reading needed map data from the map storing means 2 in response to output signals from the scale setting means 4 and current position estimating means 5, and 7 denotes an image converting means for converting map data read by the map reading means 6 into image information to be output to the display means 1.

Reference numeral 8 denotes a destination inputting means through which a driver inputs a destination, 9 denotes a distance determining means for determining the distance from the current position of the vehicle to the destination on the basis of position data output by the current position estimating means 5 and destination data input through the destination inputting means 8, 10 denotes an information storing means for storing road traffic information such as road information input in advance and traffic information input sequentially as needed, 11 denotes an information reading means for reading data which are associated with the current position from the information storing means 10, and 12 denotes an information restricting means for judging the importance of the road traffic information on the basis of data about the information output by the information reading means 11 and data about the distance output by the distance determining means 9 so as to prevent some pieces of road traffic information of little importance from being output to the display means 1 through the image converting means 7.

Next, a description will be made as to the operation of the prior art navigation device. FIGS. 27 through 30 are views of examples of a display of road traffic information added to a map displayed on the screen of the display means 1 of the navigation device shown in FIG. 26. Reference characters A to F denote respective pieces of road traffic information displayed on the screen of the display means 1, and A shows the current position of the vehicle, B shows a piece of information about a traffic jam, C shows a piece of information about a traffic regulation or control, D shows a specified area surrounded by dashed lines each of which forms a predetermined angle with the moving direction of the vehicle, E shows a recommended route to the destination, and F shows a route along which the vehicle is scheduled to move.

First, when the map reading means 6 receives a setting of the scale of a map set by a user through the scale setting means 4 and the current position of the vehicle estimated by the current position estimating means 5, it reads the map data on a map to be displayed on the screen of the display means 1 from the map storing means 2 in accordance with the scale of the map and current position of the vehicle. Then, the device displays the map on the screen of the display means 1 on the basis of the map data read out of the map storing means, and displays road traffic information on the map on-screen. Displaying all pieces of road traffic information increases the complexity of the screen display and hence causes a reduction in the visibility. To eliminate this problem, the information restricting means 12 prevents some pieces of road traffic information of little importance from being displayed on the display means 1.

That is, as shown in the example of FIG. 27, the device is adapted to set a specified area D surrounded by dashed lines each of which forms a predetermined angle with the moving direction of the vehicle and display only some pieces of road traffic information (i.e., three symbols B each showing a piece of traffic-jam information and two symbols C each showing a piece of traffic control information) which exist within the area D rather than all pieces of road traffic information. Furthermore, in the example shown in FIG. 28, the device is adapted to determine whether or not it displays each of all symbols B indicating a traffic-jam in accordance with the length of each of the traffic-jams. The device shows only traffic-jam symbols B each showing a traffic jam with a length which is equal to or longer than a predetermined length on the display means 1 so as to restrict the display of other traffic-jam symbols B each showing a traffic jam with a length which is shorter than the predetermined length.

Alternatively, as shown in FIGS. 29 and 30, when either a recommended route E from the current position A to the destination or a route F along which the vehicle is scheduled to move is displayed on the screen, the device judges the importance of road traffic information with reference to the recommended route E or route F along which the vehicle is scheduled to move so as to conclude that some road traffic information symbols other than other road traffic information symbols which exist in the vicinity of the recommended route E or on the route F along which the vehicle is scheduled to move are of little importance. Thus, the device restricts the display of the road traffic information symbols of little importance to display only the other road traffic information symbols, which exist in the vicinity of the recommended route E or on the route F along which the vehicle is scheduled to move, on the map.

Since such a prior art navigation device is so constructed as mentioned above, there is a problem in that though the device improves the visibility of the display screen by judging the importance of road traffic information and then restricting the output of some pieces of road traffic information which are concluded to be of little importance to the display means 1, the device cannot provide rich amounts of information.

SUMMARY OF THE INVENTION

The present invention is made to overcome the aforementioned problem. More precisely, it is an object of the present invention to provide a navigation device which when displaying road traffic information on a map displayed on the screen of a display unit, can provide rich amounts of information without reducing the visibility of the screen.

In accordance with the present invention, there is provided a navigation device mounted on a vehicle, comprising: a display means for displaying a road map of an area in which the vehicle is travelling, a current position mark for indicating a current position of the vehicle on the road map on-screen, and a traffic-jam indicating symbol indicating that a road is in a traffic jam; a map data storing means for storing data on the road map displayed by the display means; a current position detecting means for detecting the current position of the vehicle and for outputting data on the current position in order for the display means to display the current position mark; a traffic information receiving means for receiving traffic information in order for the display means to display a traffic-jam indicating symbol; and a display form controlling means for displaying a traffic-jam indicating symbol along a road in a traffic jam on the road map displayed on the display means, and for changing display forms of either roads or traffic-jam indicating symbols on the road map on-screen when the display form controlling means determines from the traffic information received that a number of links each of which are respectively connecting two nodes such as intersections and includes a congested road section is equal to or more than a predetermined number.

In a preferred embodiment of the present invention, the display form controlling means changes the display forms of the roads displayed on the screen of the display means by changing colors of the roads color-coded into a plurality of colors according to types of the roads to an identical quiet color regardless of the types of the roads.

In a preferred embodiment of the present invention, the display form controlling means changes the display forms of the roads displayed on the screen of the display means by changing widths of the roads predetermined according to types of the roads to an identical smaller width regardless of the types of the roads.

In a preferred embodiment of the present invention, the display form controlling means changes the display forms of only congested roads displayed on the screen of the display means by changing colors of the congested roads on-screen predetermined according to types of the roads to an identical quiet color regardless of the types of the roads. Preferably, the quiet color is the same as the background of the road map on-screen.

In a preferred embodiment of the present invention, the display form controlling means changes the display forms of the traffic-jam indicating symbols displayed on the screen of the display means by reducing a width of the traffic-jam indicating symbols on-screen.

In a preferred embodiment of the present invention, the display form controlling means changes the display forms of the traffic-jam indicating symbols displayed on the screen of the display means by changing a color of the traffic-jam indicating symbols on-screen to a quiet color. Preferably, the quiet color is similar to the color of the background of the road map on-screen In accordance with the present invention, there is provided a navigation device mounted on a vehicle, comprising: a display means for displaying a road map of an area in which the vehicle is travelling, a current position mark for indicating a current position of the vehicle on the road map on-screen, and a traffic-jam indicating symbol indicating that a road is in a traffic jam; a map data storing means for storing data on the road map displayed by the display means; a current position detecting means for detecting the current position of the vehicle and for outputting data on the current position in order for the display means to display the current position mark; a traffic information receiving means for receiving traffic information in order for the display means to display a traffic-jam indicating symbol; and a display form controlling means for displaying a traffic-jam indicating symbol along a road in a traffic jam on the road map displayed on the display means, and for changing display forms of either roads or traffic-jam indicating symbols on the road map on-screen when a scale of the road map displayed on the display means is smaller than a predetermined scale.

In a preferred embodiment of the present invention, the display form controlling means changes the display forms of the roads displayed on the screen of the display means by changing colors of the roads color-coded into a plurality of colors according to types of the roads to an identical quiet color regardless of the types of the roads.

In a preferred embodiment of the present invention, the display form controlling means changes the display forms of the roads displayed on the screen of the display means by changing widths of the roads predetermined according to types of the roads to an identical smaller width regardless of the types of the roads.

In a preferred embodiment of the present invention, the display form controlling means changes the display forms of only congested roads displayed on the screen of the display means by changing colors of the congested roads on-screen predetermined according to types of the roads to an identical quiet color regardless of the types of the roads. Preferably, the quiet color is the same as the background of the road map on-screen.

In a preferred embodiment of the present invention, the display form controlling means changes the display forms of the traffic-jam indicating symbols displayed on the screen of the display means by reducing a width of the traffic-jam indicating symbols on-screen.

In a preferred embodiment of the present invention, the display form controlling means changes the display forms of the traffic-jam indicating symbols displayed on the screen of the display means by changing a color of the traffic-jam indicating symbols on-screen to a quiet color. Preferably, the quiet color is similar to the color of the background of the road map on-screen.

Further objects and advantages of the present invention will be apparent from the following description of the preferred embodiments of the invention as illustrated in the accompanying drawings.

BRIEF DESCRIPTION OF THE DRAWINGS

FIG. 22 is a flow chart indicating flow of control by the navigation device according to the ninth embodiment;

DETAILED DESCRIPTION OF THE PREFERRED EMBODIMENTS

Next, a description will be made as to an embodiment of the present invention.

Figure 1:
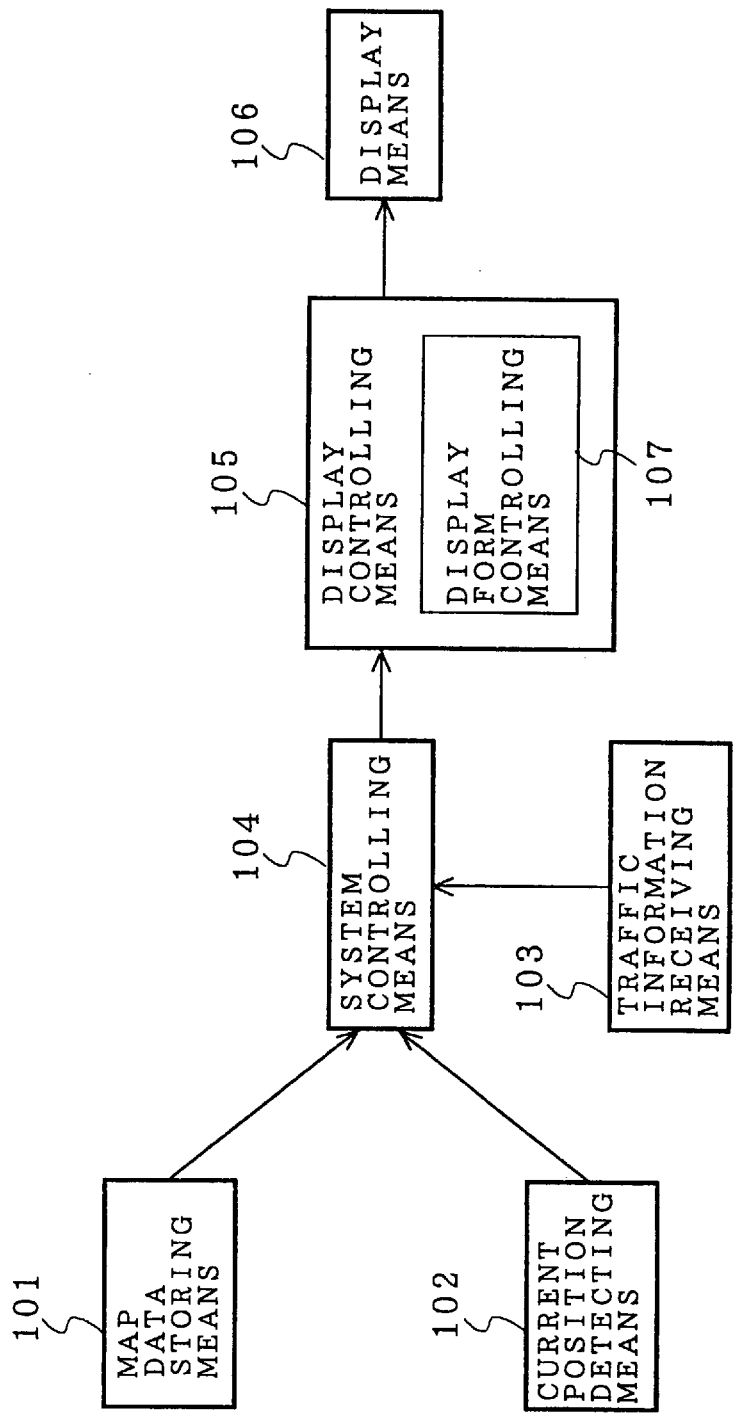
FIG. 1 is a block diagram showing the functional structure of a navigation device according to a first embodiment of the present invention.

Referring now to FIG. 1, it illustrates a block diagram showing the functional structure of a navigation device according to the first embodiment of the present invention. In the figure, reference numeral 101 denotes a map data storing means for storing map data such as pieces of road information, 102 denotes a current position determining means for determining the current position of a vehicle equipped with the navigation device of the present invention from output data of various sensors mounted on the vehicle, 103 denotes a traffic information receiving means for receiving pieces of road traffic information about traffic jams or the like delivered thereto through an FM multiplexing broadcast or the like, and 104 denotes a system control means for controlling the operations of the whole navigation device, such as reading needed map data from the map data storing means 101, capturing the current position information of the vehicle from the current position detecting means 102, and capturing traffic information received by the traffic information receiving means 103.

Reference numeral 105 denotes a display control means for generating display signals to display a road map, a mark indicating the current position, a mark indicating the destination, and so on, in accordance with instructions from the system control means 104, 106 denotes a display means for displaying a road map, the current position mark, the destination mark, and so on, in accordance with display signals from the display control means 105, and 107 denotes a display form control means disposed within the display control means 105, for displaying a traffic-jam indicating symbol such as a traffic-jam indicating line showing a traffic jam along a road in a traffic jam on a map displayed on the screen of the display means 106 on the basis of the traffic information received by the traffic information receiving means 103, and when the number of links each of which includes a road section in a traffic jam is equal to or larger than a predetermined value, the number of links being obtained from the traffic information received, changing the display forms (or display styles) of roads displayed on the display screen of the display means 106, i.e., the display color of each of the roads color-coded into a plurality of colors according to the types of the roads.

Figure 2:
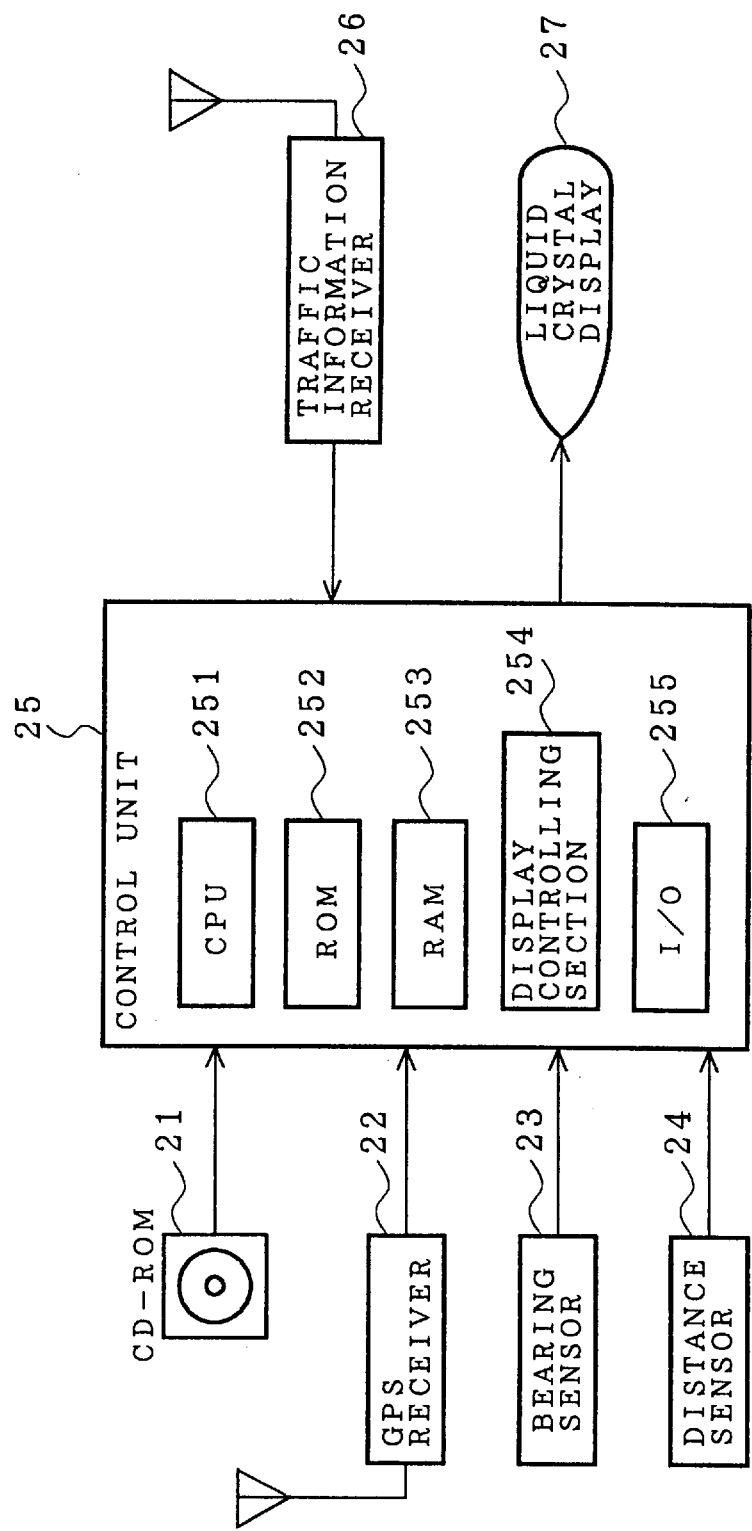
FIG. 2 is a block diagram showing an example of the hardware structure of the navigation device according to the first embodiment.

Referring now to FIG. 2, it illustrates a block diagram showing an example of the hardware structure of the navigation device according to the first embodiment of the present invention. In the figure, reference numeral 21 denotes a CD-ROM driver with a CD-ROM (Compact Disk Read Only Memory), which corresponds to the map data storing means 101 in FIG. 1, 22 denotes a GPS (Global Positioning System) receiver for detecting the current position of the vehicle, 23 denotes a bearing sensor for detecting the bearing of the vehicle, and 24 denotes a distance sensor for detecting the travel of the vehicle. The combination of the GPS receiver 22, bearing sensor 22, and distance sensor 24 corresponds to the current position detecting means 102 shown in FIG. 1.

Furthermore, reference numeral 25 denotes a control unit comprised of a CPU (Central Processing Unit) 251, a ROM (Read Only Memory) 252, a RAM (Random Access Memory) 253, a display control section 254 for performing the control of a display by the display means 27, an I/O (input/output section) 255 for doing input and output between the device and the outside, for controlling various arithmetic operations and the whole of the device. The control unit corresponds to the combination of the system control means 104 and display control means 105 shown in FIG. 1. Reference numeral 26 denotes a traffic information receiver for receiving road traffic information delivered by means of a beacon, a FM multiplexing broadcast, or the like, and the receiver 26 corresponds to the traffic information receiving means 103 shown in FIG. 1. Furthermore, reference numeral 27 denotes a liquid crystal display for displaying display data from the control unit 25, and the liquid crystal display 27 corresponds to the display means 106 shown in FIG. 1.

Figure 3:
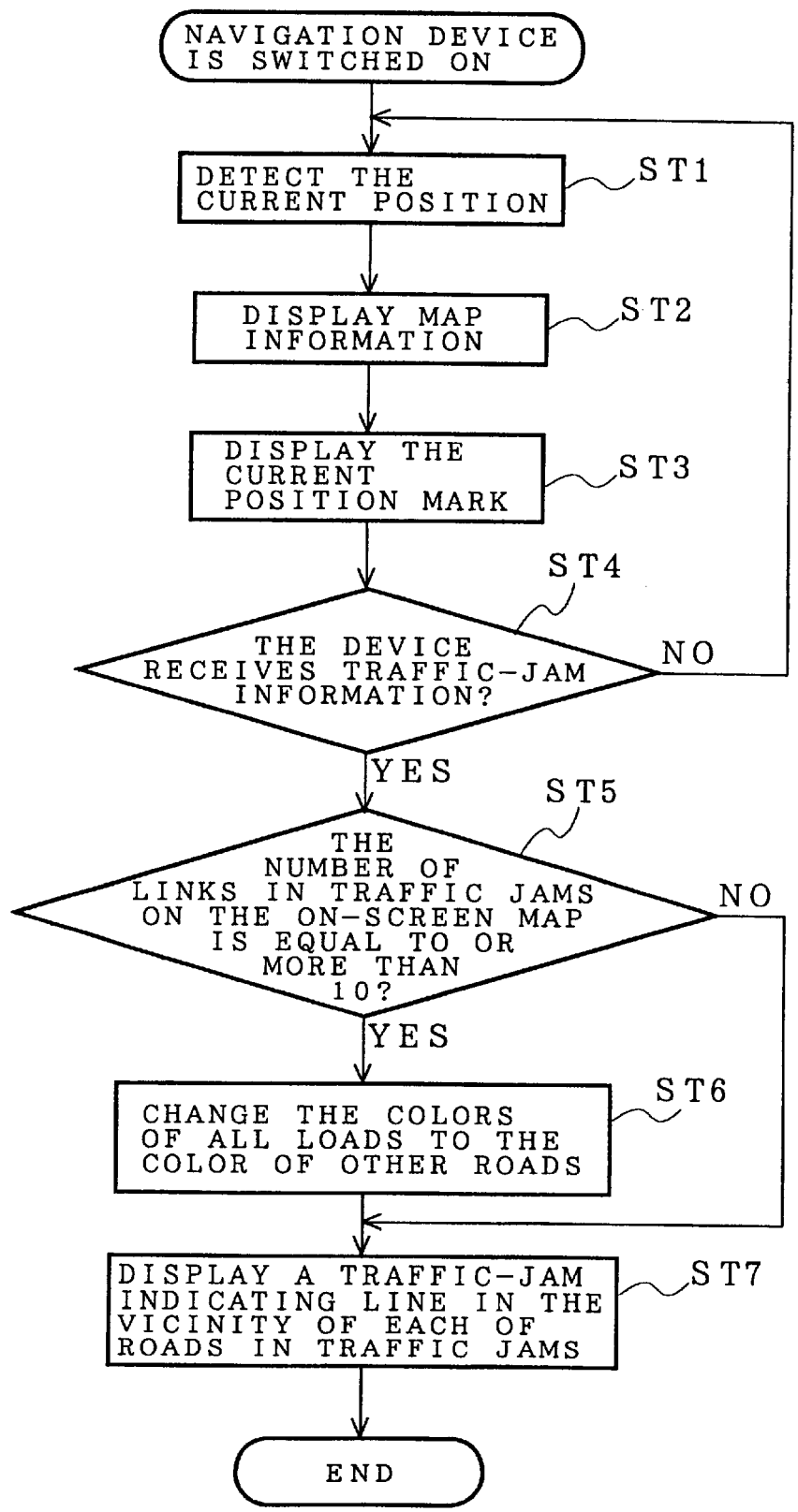
FIG. 3 is a flow chart indicating flow of control by the navigation device according to the first embodiment.
Figure 4A:
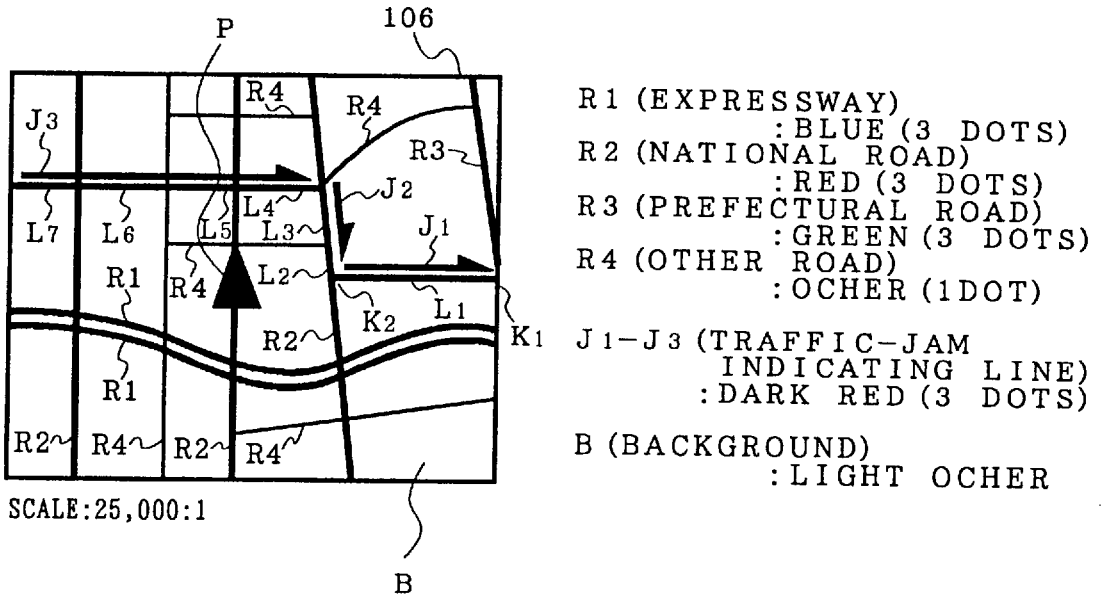
FIGS. 4a and 4b are views showing examples of a display by the navigation device according to the first embodiment.
Figure 4B:
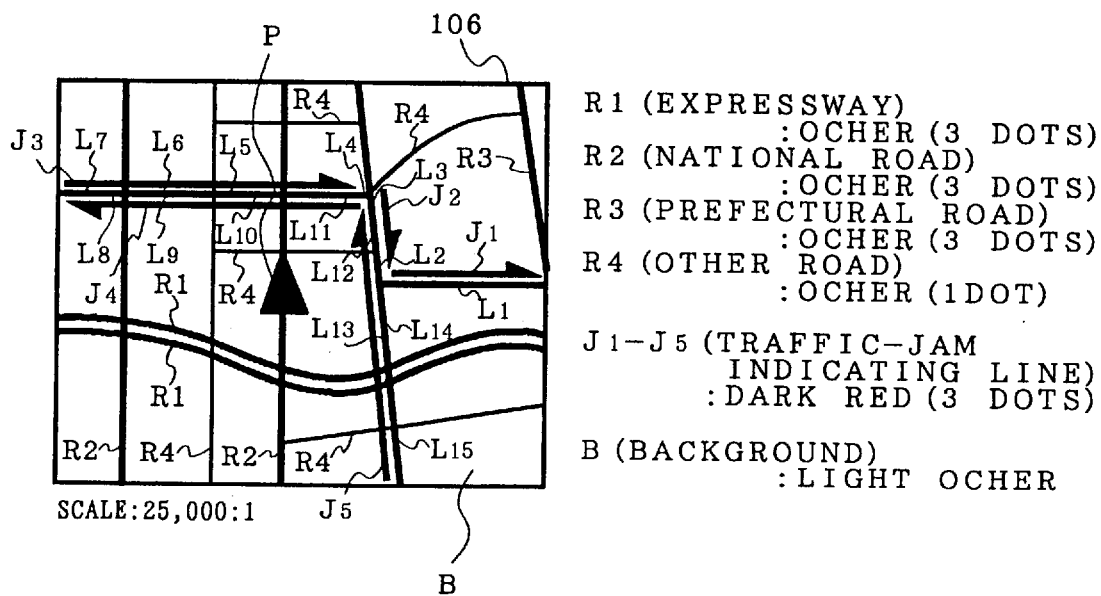

Next, a description will be made as to the operation of the navigation device according to the first embodiment. The navigation device of the first embodiment is adapted to change the display form of a road map, i.e., the display colors of roads on the road map on-screen in accordance with the extents of traffic jams. FIG. 3 is a flow chart indicating flow of control by the navigation device having the aforementioned structure, and FIGS. 4a and 4b are views showing examples of a display on the screen of the display means 106. In FIGS. 4a and 4b, reference character P denotes a current position mark indicating the current position of the vehicle, R1 denotes an expressway, R2 denotes a national road, R3 denotes a prefectural road, R4 denotes another road, J denotes a traffic-jam indicating line indicating a road in a traffic jam, K denotes a node such as an intersection on a road, L denotes a link connecting between two nodes K, and B denotes the background of the map. Hereinafter, the operation will be described with reference to FIGS. 3, 4a, and 4b.

First, the navigation device, in step ST1, detects the current position of the vehicle equipped with the navigation device on the basis of data received by the GPS receiver 22 and so on by means of the current position detecting means 102. Then, the device reads map data in the vicinity of the current position from the map data storing means 101, and displays the road map on the screen of the display means 106 in accordance with display colors and widths of roads predetermined according to the types of the roads in such a manner that expressways R1 are colored blue and are 3 dots wide (one dot is equal to the width and height of a pixel, i.e., the minimum element which constructs the display screen), national roads R2 are displayed in red and are 3 dots wide, prefectural roads R3 are displayed in green and are 3 dots wide, and roads R4 are displayed in ocher and are 1 dot wide, in step ST2. Next, the display controlling means 105, in step ST3, displays the current position mark P at a position on the on-screen map which corresponds to the current position detected in step ST 1. The background B of the map is colored light ocher, which is near to the display color of the other roads R4.

Then, the device, in step ST4, determines whether or not the traffic information receiving means 103 has received traffic-jam information. When the device determines that the traffic information receiving means 103 has received traffic-jam information, the device advances to step ST5. On the contrary, when the device determines that the traffic information receiving means 103 has not received traffic-jam information yet, the device returns to step ST1 and repeats the operations of steps ST1 to ST4.

The display form controlling means 107, in step ST5, determines whether or not the number of links L in traffic jams which exist within the on-screen map displayed on the display means 106 is equal to or larger than 10, on the basis of the traffic-jam information (for example, the link L1 in a traffic jam, the length of which is 1 km and the direction of which is the upward direction) received through the traffic information receiving means 103. When the display form controlling means 107 determines that the number of such links L is equal to or larger than 10, it proceeds to step ST6. On the contrary, when the display form controlling means 107 determines that the number of such links L is smaller than 10, it proceeds to step ST7.

The display form controlling means 107, in step ST6, changes the colors of all the on-screen roads color-coded according to the types of the roads to an identical quiet color as compared with the color (light ocher) of the background B, for example, the same color as that of the other roads R4, i.e., ocher, and recreates the map on the screen of the display means 106. Then, the display form controlling means 107 advances to step ST7.

The display form controlling means 107, in step ST7, displays traffic-jam indicating lines J in the vicinity of roads in traffic jams on the on-screen map displayed on the display means 106, respectively. The series of processes is thus completed. These traffic-jam indicating lines J are displayed at the left-hand side of the respective on-screen roads in traffic jams with respect to the direction in which the vehicle is to be headed, in a state in which the traffic-jam indicating lines J are colored dark red and are 3 dots wide.

FIG. 4a shows an example of a display in the case where there are seven links in traffic jams; L1, L2, . . . , and L7, that is, the number of links in traffic jams is smaller than 10. All roads are displayed together with dark red traffic-jam indicating lines J1 to J3 with a width of 3 dots, such that expressways R1 are colored blue and are 3 dots wide, national roads R2 are colored red and are 3 dots wide, prefectural roads R3 are colored green and are 3 dots wide, and other roads R4 are colored ocher and are 1 dot wide. On the contrary, FIG. 4b shows an example of a display in the case where there are fifteen links in traffic jams; L1, L2, . . . , and L15, that is, the number of links in traffic jams is equal to or larger than 10. In this case, all roads are displayed together with dark red traffic-jam indicating lines J1 to J5 with a width of 3 dots, such that expressways R1, national roads R2, and, prefectural roads R3 are colored ocher and are 3 dots wide, and other roads R4 are colored ocher and are 1 dot wide.

As mentioned above, the device changes the colors of all roads in a road map on-screen to a quiet color which is similar to the color of the background of the map when the device receives a lot of information about traffic jams. Therefore, even when a number of traffic-jam indicating lines J are needed to be displayed, they can be displayed prominently. Thereby, such traffic-jam conditions can be recognized with the visibility of a road map on-screen improved.

Figure 5:
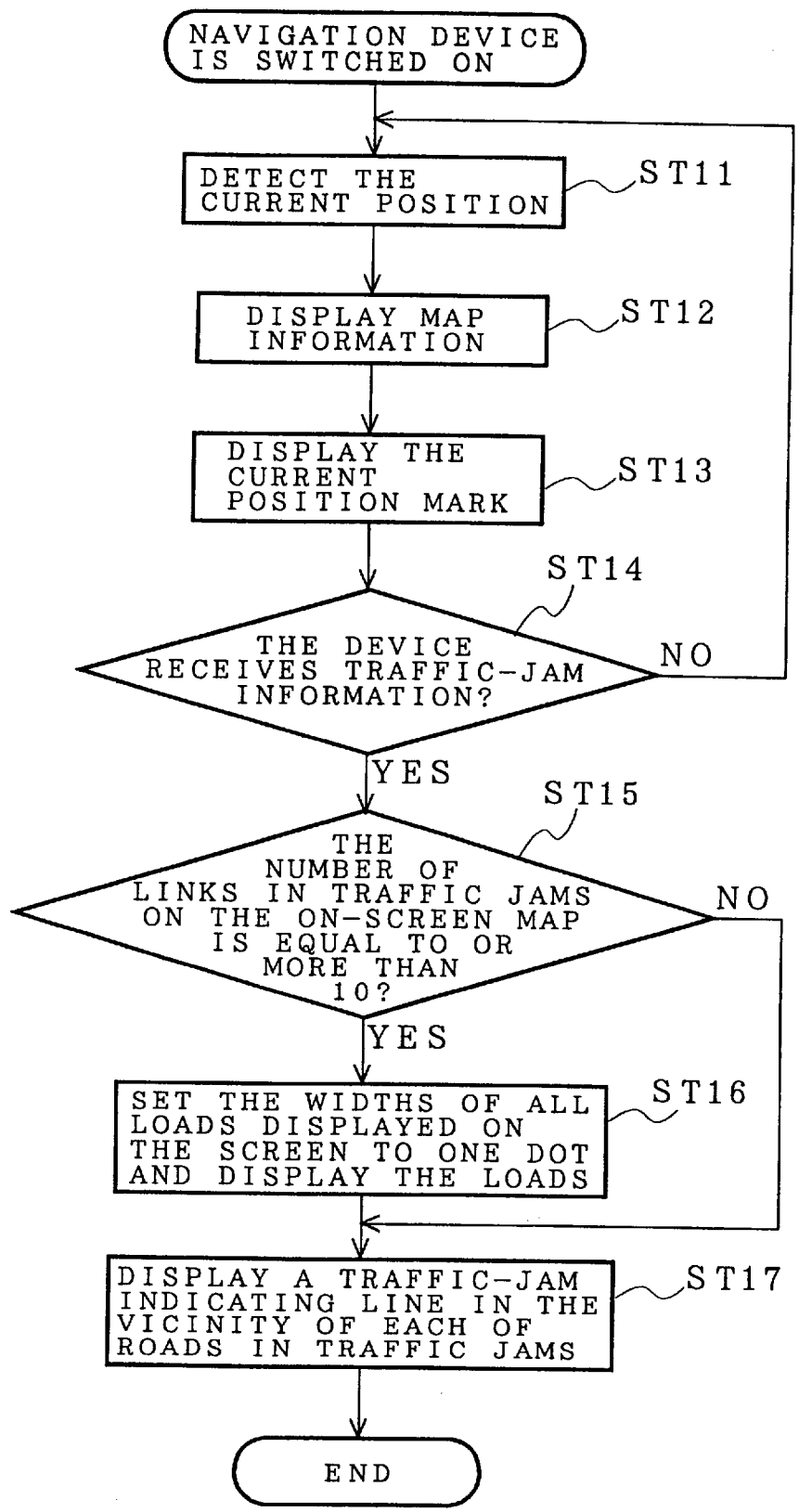
FIG. 5 is a flow chart indicating flow of control by the navigation device according to a second embodiment of the present invention.

Next, a description will be made as to a navigation device according to a second embodiment of the present invention. As previously mentioned, the device according to the aforementioned first embodiment changes the colors of all roads on a map on-screen to a quiet color as compared with the color of the background on the map when the number of links in traffic jams on a map on-screen is equal to or more than a predetermined number. In contrast to the first embodiment, the device of the second embodiment is adapted to reduce the widths of all roads on-screen instead of changing the colors of the on-screen roads. FIG. 5 is a flow diagram indicating flow of control by the navigation device of the second embodiment, and FIGS. 6a and 6b are views showing examples of a display screen of the display means 106.

Next, a description will be made as to the operation of the navigation device according to the second embodiment. The processes of steps ST11 to ST15 are the same as those of steps ST1 to ST5 shown in FIG. 3 in the first embodiment, and the description of the processes will be omitted hereinafter. When the display form controlling means 107, in step ST15, determines that the number of links L in traffic jams which exist on a map displayed on the screen of the display means 106 is equal to or larger than 10, it proceeds to step ST16. On the contrary, when the display form controlling means 107 determines that the number of such links L is smaller than 10, it proceeds to step ST17. The display form controlling means 107, in step ST16, changes the widths of all the on-screen roads displayed in step ST12, the widths being predetermined according to the types of the roads, to an identical width of 1 dot, and recreates the map on the screen of the display means 106. Then, the display form controlling means 107 advances to step ST17. Like the first embodiment, the display form controlling means 107, in step ST17, displays traffic-jam indicating lines J in the vicinity of roads in traffic jams on the on-screen map displayed on the display means 106, respectively. The series of processes is thus completed.

Figure 6A:
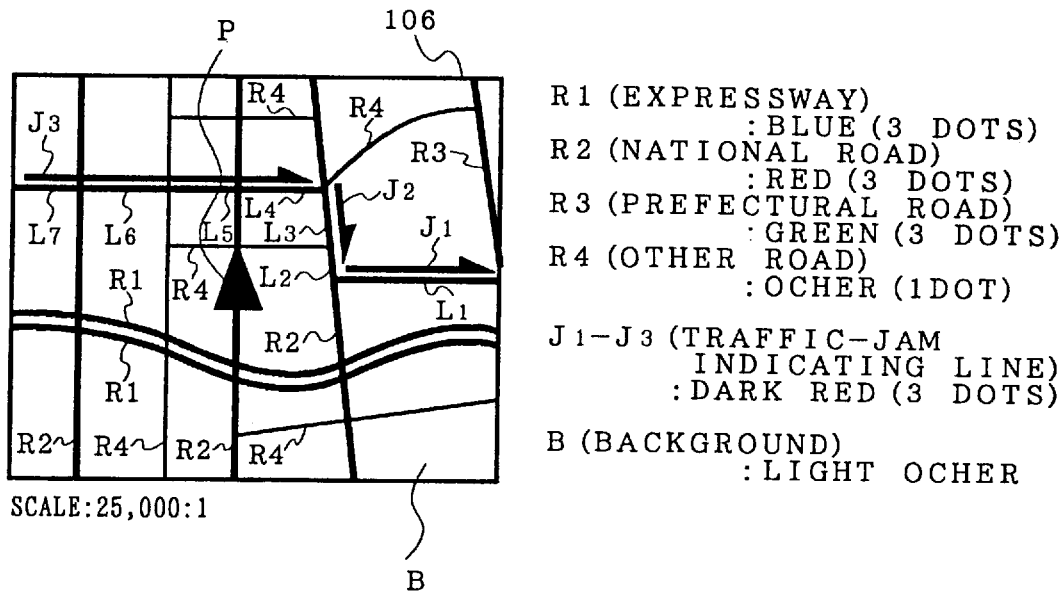
FIGS. 6a and 6b are views showing examples of a display by the navigation device according to the second embodiment.
Figure 6B:
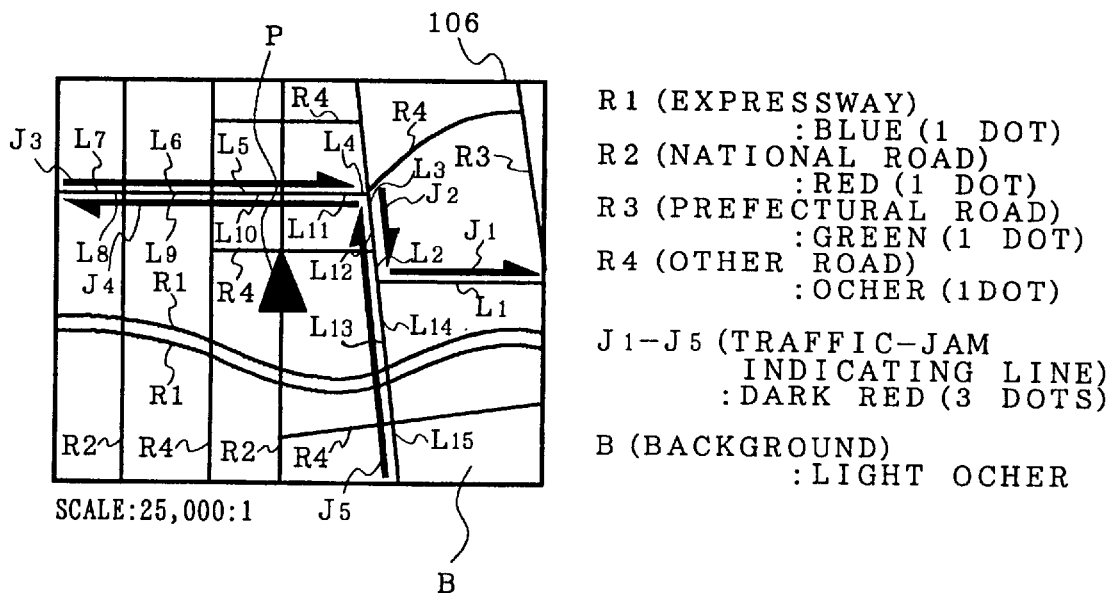

FIG. 6a shows an example of a display in the case where the number of links in traffic jams is smaller than 10, and FIG. 6b shows an example of a display in the case where the number of links in traffic jams is equal to or larger than 10. In the example shown in FIG. 6a, all roads are displayed together with dark red traffic-jam indicating lines J1 to J3 with a width of 3 dots, such that expressways R1 are colored blue and are 3 dots wide, national roads R2 are colored red and are 3 dots wide, prefectural roads R3 are colored green and are 3 dots wide, and other roads R4 are colored ocher and are 1 dot wide. On the contrary, in the example shown in FIG. 6b, all roads are displayed together with dark red traffic-jam indicating lines J1 to J5 with a width of 3 dots, such that expressways R1 are colored blue, national roads R2 are colored red, prefectural roads R3 are colored green, other roads R4 are colored ocher, and all the roads are 1 dot wide.

As mentioned above, the device reduces the widths of all roads in a road map on-screen when the device receives a lot of information about traffic jams. Therefore, even when a number of traffic-jam indicating lines J are needed to be displayed, they can be displayed prominently. Thereby, such traffic-jam conditions can be recognized with the visibility of a road map on-screen improved.

Figure 7:
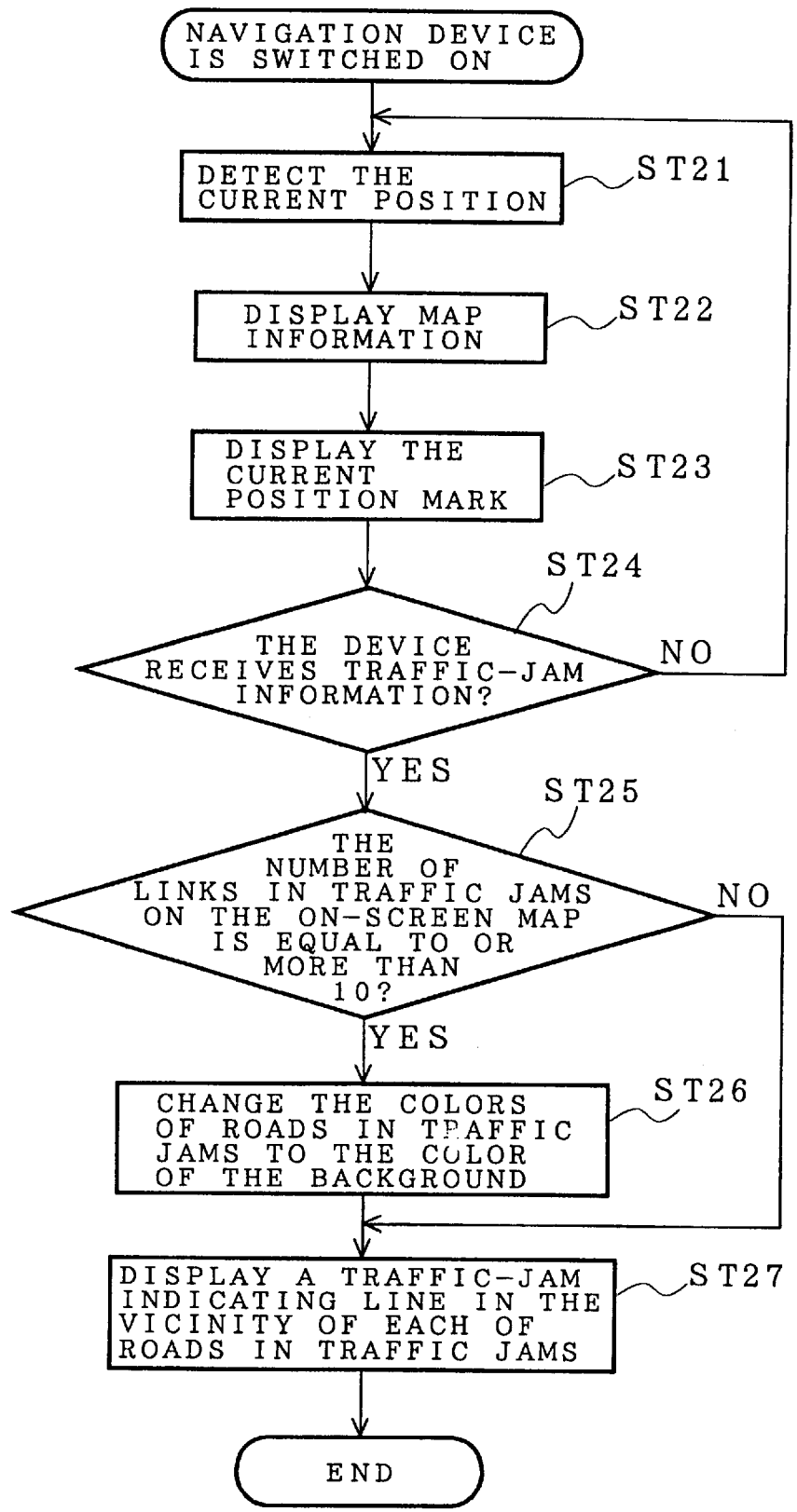
FIG. 7 is a flow chart indicating flow of control by the navigation device according to a third embodiment of the present invention.

Next, a description will be made as to a navigation device according to a third embodiment of the present invention. As previously mentioned, the device according to the aforementioned first or second embodiment changes all the colors or widths of roads on a map on-screen when the number of links in traffic jams on a map on-screen is equal to or more than a predetermined number. In contrast to the first and second embodiments, the device of the third embodiment is adapted to change the colors of only on-screen roads in traffic jams to a color which is identical to the color of the background of the map instead of changing the colors or widths of all roads on-screen. FIG. 7 is a flow diagram indicating flow of control by the navigation device of the third embodiment, and FIGS. 8a and 8b are views showing examples of a display screen of the display means 106.

Next, a description will be made as to the operation of the navigation device according to the third embodiment. The processes of steps ST21 to ST25 are the same as those of steps ST1 to ST5 shown in FIG. 3 in the first embodiment, and the description of the processes will be omitted hereinafter. When the display form controlling means 107, in step ST25, determines that the number of links L in traffic jams which exist on a map displayed on the screen of the display means 106 is equal to or larger than 10, it proceeds to step ST26. On the contrary, when the display form controlling means 107 determines that the number of such links L is smaller than 10, it proceeds to step ST27. The display form controlling means 107, in step ST26, changes the colors of on-screen roads in traffic jams displayed in step ST22 to light ocher which is the same as that of the background B of the map, and recreates the map on the screen of the display means 106. Then, the display form controlling means 107 advances to step ST27. Like the first embodiment, the display form controlling means 107, in step ST27, displays traffic-jam indicating lines J in the vicinity of roads in traffic jams on the on-screen map displayed on the display means 106, respectively. The series of processes is thus completed.

Figure 8A:
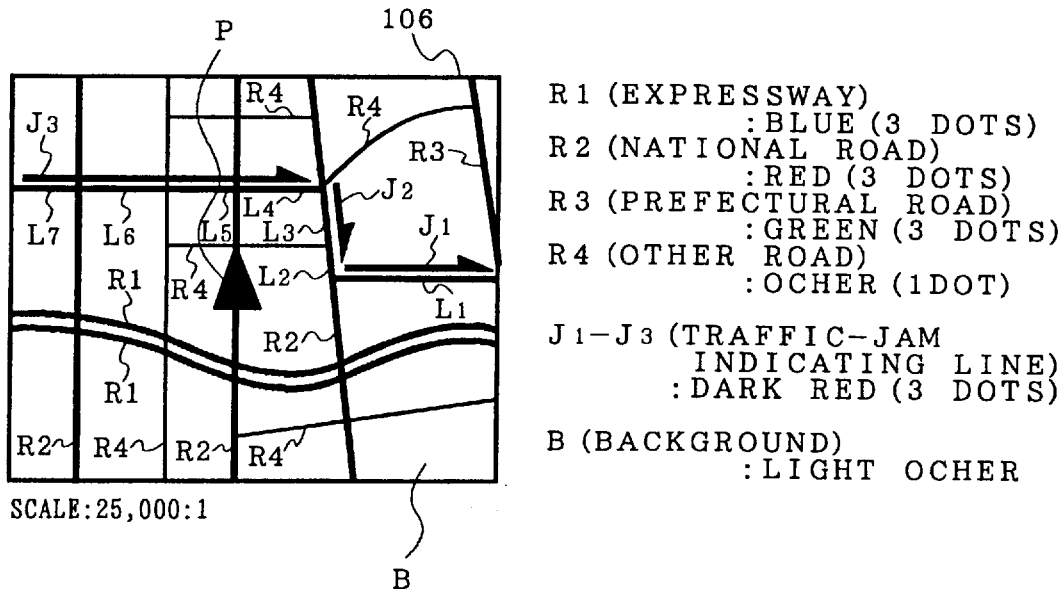
FIGS. 8a and 8b are views showing examples of a display by the navigation device according to the third embodiment.
Figure 8B:
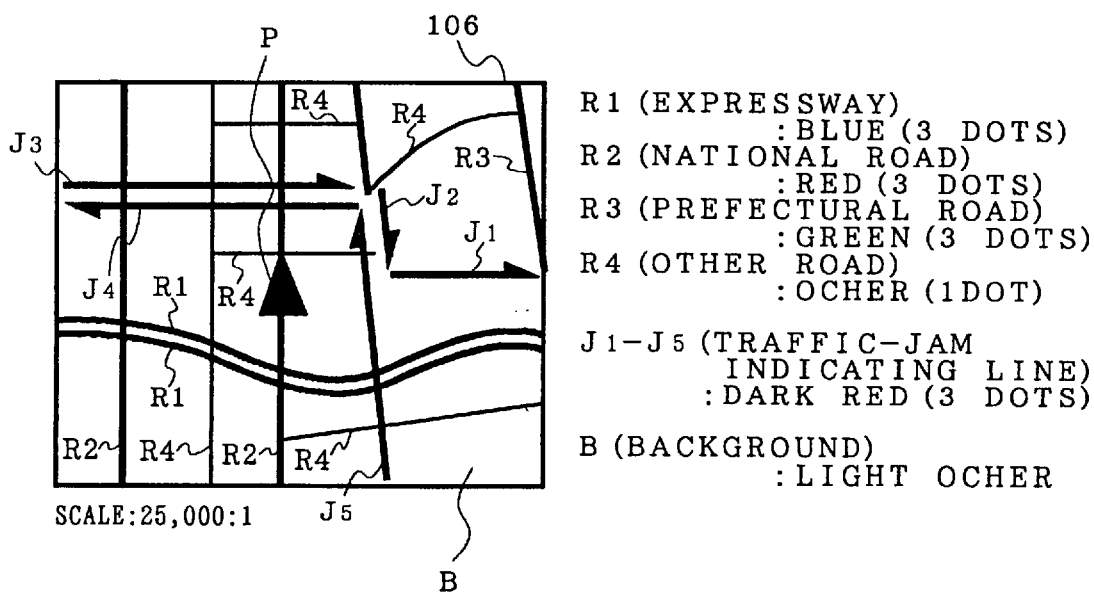

FIG. 8a shows an example of a display in the case where the number of links in traffic jams is smaller than 10, and FIG. 8b shows an example of a display in the case where the number of links in traffic jams is equal to or larger than 10. In the example shown in FIG. 8a, roads in traffic jams are also displayed in colors predetermined according to the types of the roads. On the contrary, in the example shown in FIG. 8b, roads in traffic jams disappear because the colors of the congested roads is changed to the color of the background B, and hence only traffic-jam indicating lines J1 to J5 can be seen along the roads in traffic jams which can be no longer seen.

As mentioned above, the device makes all roads in traffic jams on an on-screen road map become invisible by changing the colors of all of the congested roads to the same color as the background when the device receives a lot of information about traffic jams. Therefore, even when a lot of traffic-jam information is needed to be displayed, traffic-jam conditions can be recognized with the visibility of a road map on-screen improved.

Figure 9:
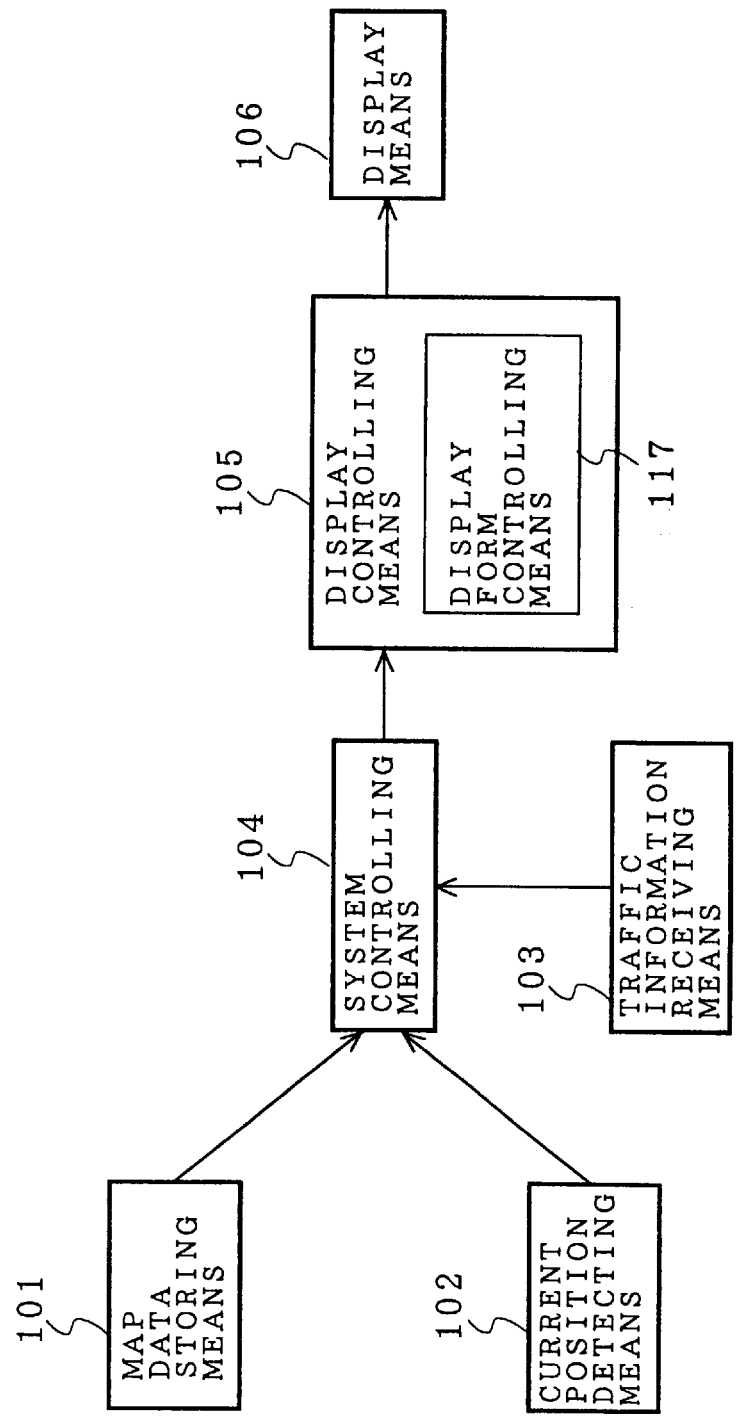
FIG. 9 is a block diagram showing the functional structure of a navigation device according to a fourth embodiment of the present invention.

Next, a description will be made as to a navigation device according to a fourth embodiment of the present invention. FIG. 9 is a block diagram showing the functional structure of the navigation device of the fourth embodiment of the present invention. The same components as those of the navigation device according to the first embodiment are designated by the same reference numerals as those in FIG. 1, and the description about the elements will be omitted hereinafter. In FIG. 9, reference numeral 117 denotes a display form controlling means disposed within the display control means 105, for displaying a traffic-jam indicating line showing a traffic jam along a road in a traffic jam on a map displayed on the display means 106 on the basis of traffic information received by the traffic information receiving means 103, and, when the number of links each of which includes a congested road section is equal to or larger than a predetermined value, the number of links being obtained from the traffic information received, changing the display form of traffic-jam indicating lines displayed on the display screen of the display means 106, i.e., the widths of the on-screen traffic-jam indicating lines. Since the hardware structure of the device is the same as that of the device according to the first embodiment, the description about the hardware structure will be omitted hereinafter.

Figure 10:
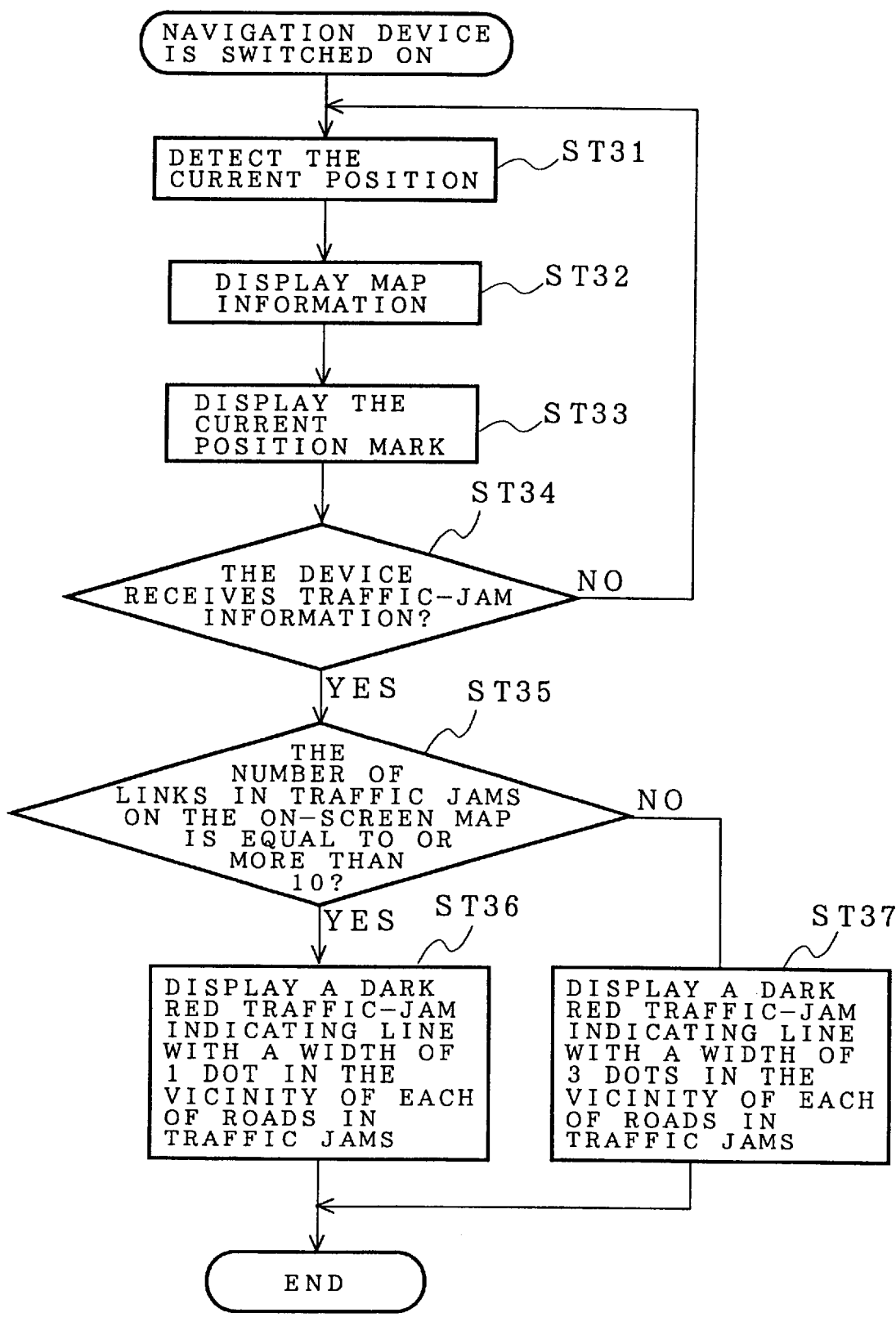
FIG. 10 is a flow chart indicating flow of control by the navigation device according to the fourth embodiment.
Figure 11A:
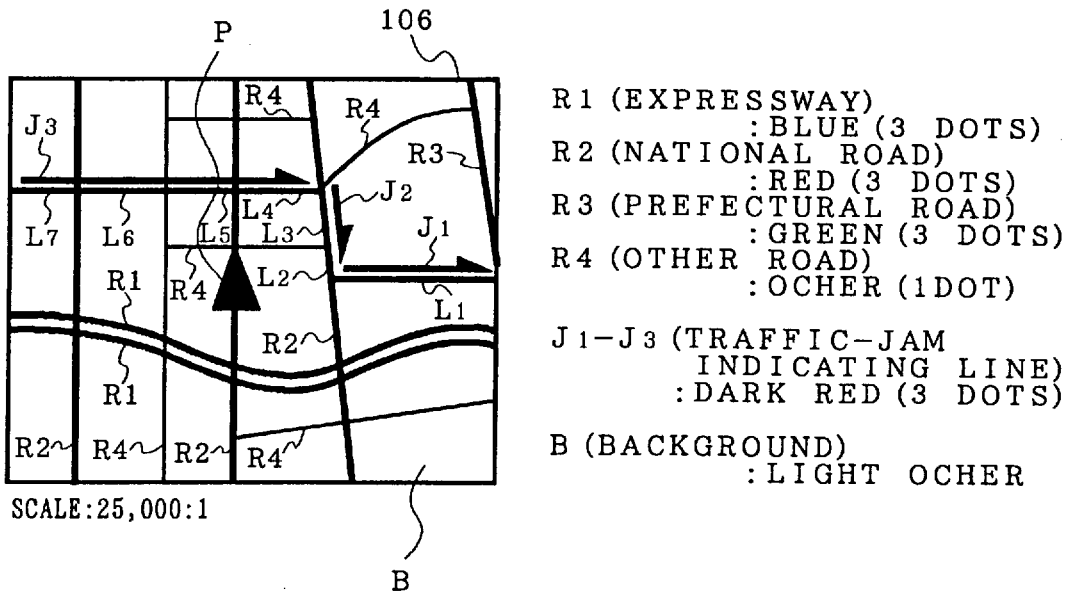
FIGS. 11a and 11b are views showing examples of a display by the navigation device according to the fourth embodiment.
Figure 11B:
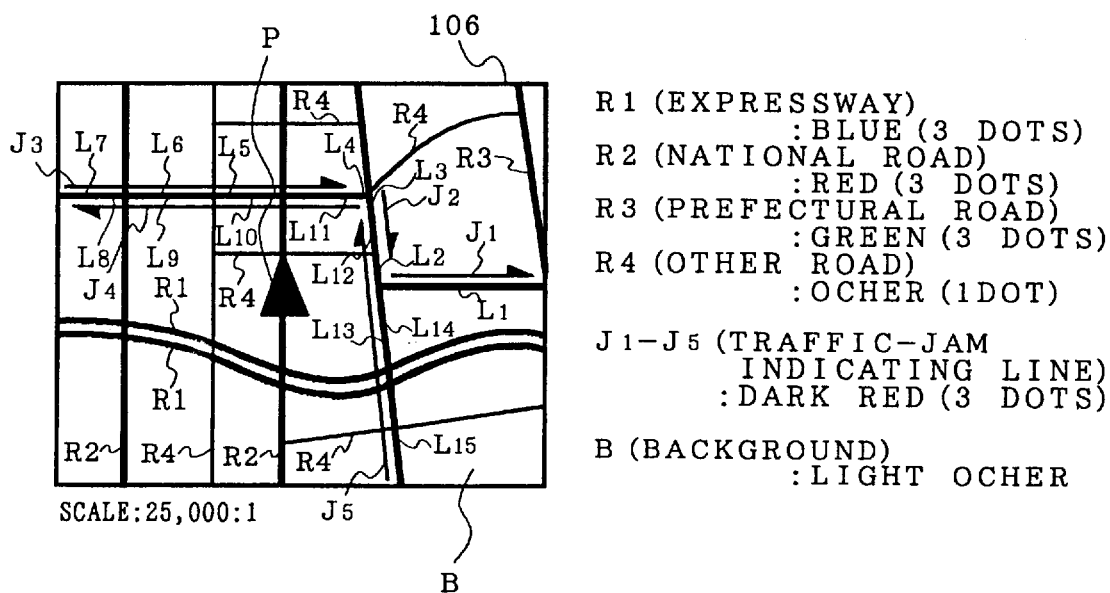

Next, a description will be made as to the operation of the navigation device according to the fourth embodiment. The navigation device of the fourth embodiment is adapted to change the widths of traffic-jam indicating lines in accordance with the extents of traffic jams. FIG. 10 is a flow diagram indicating flow of control by the navigation device which is so constructed, and FIGS. 11a and 11b are views showing examples of a display screen of the display means 106. The reference characters in FIGS. 11a and 11b respectively denote screen elements which are similar to those in FIGS. 4a and 4b. The operation will be explained hereinafter with reference to FIGS. 10, 11a and 11b.

Like the first embodiment, the navigation device, in step ST31, detects the current position of a vehicle by means of the current position detecting means 102 first. Then, the device reads map data in the vicinity of the current position from the map data storing means 101, and displays the road map on the screen of the display means 106 in accordance with display colors and widths predetermined according to the types of roads in such a manner that expressways R1 are colored blue and are 3 dots wide, national roads R2 are colored red and are 3 dots wide, prefectural roads R3 are colored green and are 3 dots wide, and other roads R4 are colored ocher and are 1 dot wide, in step ST32. Next, the display controlling means 105, in step ST33, displays the current position mark P at a position on the on-screen map which corresponds to the current position detected in step ST 31.

Then, the device, in step ST34, determines whether or not the traffic information receiving means 103 has received traffic-jam information. When the device determines that the traffic information receiving means 103 has not received traffic-jam information yet, the device returns to step ST31 and repeats the operations of steps ST31 to ST34. On the contrary, when the device determines that the traffic information receiving means 103 has received traffic-jam information, the device advances to step ST35. The display form controlling means 117, in step ST35, determines whether or not the number of links L in traffic jams which exist within the on-screen map displayed on the display means 106 is equal to or larger than 10, on the basis of the traffic-jam information received through the traffic information receiving means 103. When the display form controlling means 117 determines that the number of such links L is equal to or larger than 10, it proceeds to step ST36. On the contrary, when the display form controlling means 117 determines that the number of such links L is smaller than 10, it proceeds to step ST37.

On the basis of the traffic-jam information received by the traffic information receiving means 103, the display form controlling means 117, in step ST36, displays traffic-jam indicating lines J the color of which is dark red and the width of which is 1 dot, at the left-hand sides of the respective roads in traffic jams displayed on the on-screen map on the display means 106, with respect to the direction in which the vehicle is to be headed. Thus, the series of processes is completed. On the other hand, the display form controlling means 117, in step ST37, displays traffic-jam indicating lines J the color of which is dark red and the width of which is 3 dots on the basis of the traffic-jam information received by the traffic information receiving means 103, at the left-hand sides of the respective roads in traffic jams with respect to the direction in which the vehicle is to be headed. The series of processes is thus completed.

FIG. 11a shows an example of a display in the case where there are seven links in traffic jams; L1, L2, . . . , and L7, that is, the number of links in traffic jams is smaller than 10. Traffic-jam indicating lines J1 to J3 with a width of 3 dots are displayed in dark red together with expressways R1 with a width of 3 dots displayed in blue, national roads R2 with a width of 3 dots displayed in red, prefectural roads R3 with a width of 3 dots displayed in green, and other roads R4 with a width of 1 dot displayed in ocher. On the contrary, FIG. 11b shows an example of a display in the case where there are fifteen links in traffic jams; L1, L2, . . . , and L15, that is, the number of links in traffic jams is equal to or larger than 10. In this case, traffic-jam indicating lines J1 to J5 with a width of 1 dot are displayed in dark red together with expressways R1 with a width of 3 dots displayed in blue, national roads R2 with a width of 3 dots displayed in red, prefectural roads R3 with a width of 3 dots displayed in green, and other roads R4 with a width of 1 dot displayed in ocher.

Thus, the device reduces the widths of traffic-jam indicating lines J displayed on a road map on-screen when the device receives a lot of information about traffic jams. Therefore, even when a number of traffic-jam indicating lines J are needed to be displayed, such traffic-jam conditions and a road map can be recognized well at the same time with the visibility of the road map on-screen improved.

Figure 12:
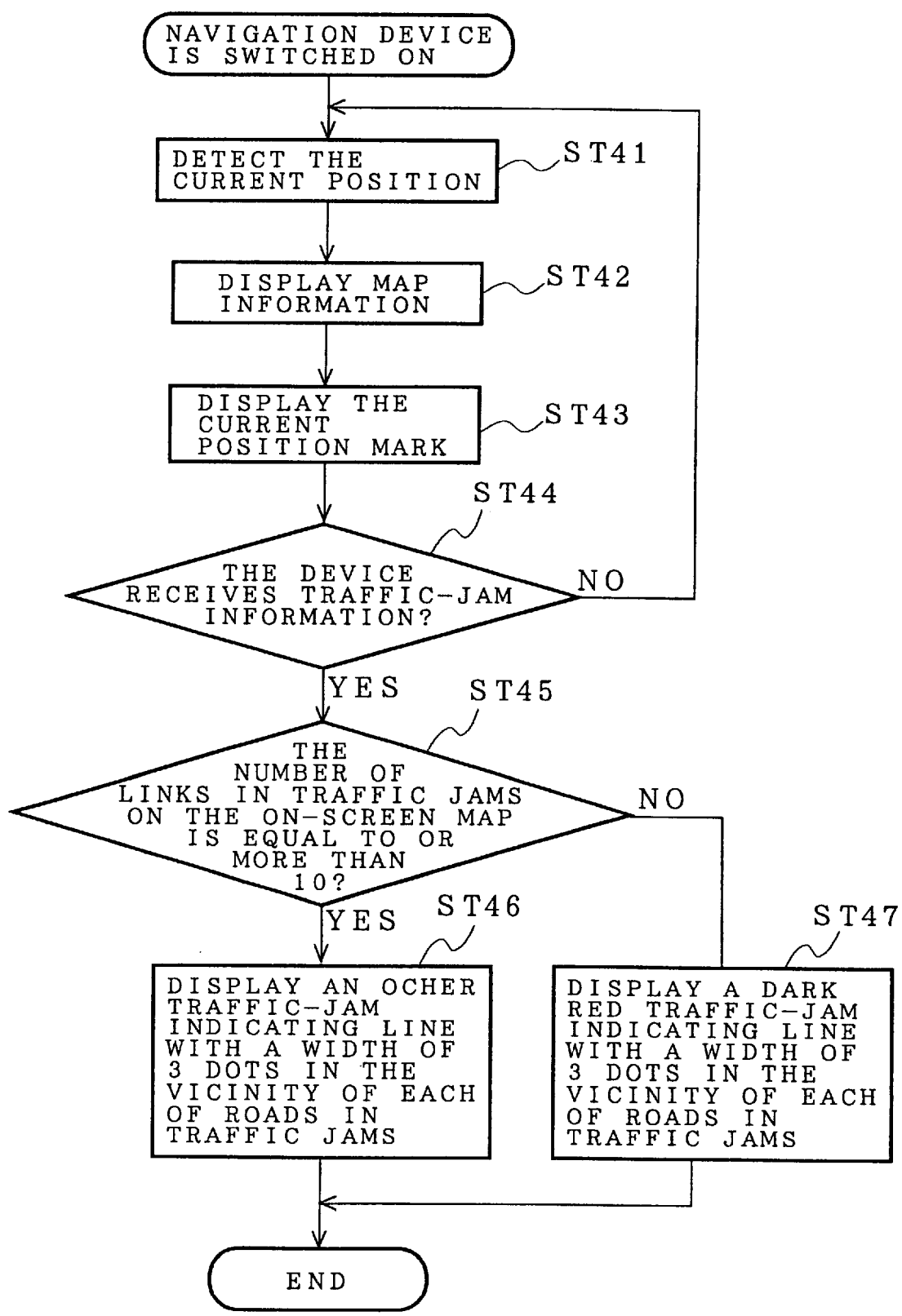
FIG. 12 is a flow chart indicating flow of control by a navigation device according to a fifth embodiment of the present invention.

Next, a description will be made as to a navigation device according to a fifth embodiment of the present invention. As previously mentioned, the device according to the aforementioned fourth embodiment changes the widths of traffic-jam indicating lines on-screen when the number of links in traffic jams included in traffic information received is equal to or larger than a predetermined number. In contrast to the fourth embodiment, the device of the fifth embodiment is adapted to change the colors of traffic-jam indicating lines on-screen to a quiet color instead of changing the widths of the traffic-jam indicating lines on-screen. FIG. 12 is a flow diagram indicating flow of control by the navigation device of the fifth embodiment, and FIGS. 13a and 13b are views showing examples of a display screen of the display means 106.

Next, a description will be made as to the operation of the navigation device according to the fifth embodiment. The processes of steps ST41 to ST45 are the same as those of steps ST31 to ST35 shown in FIG. 10 in the fourth embodiment, and the description of the processes will be omitted hereinafter. When the display form controlling means 117, in step ST45, determines that the number of congested links L which exist within the on-screen road map is equal to or larger than 10, it proceeds to step ST46. On the contrary, when the display form controlling means 117 determines that the number of such the congested links L is smaller than 10, it proceeds to step ST47. The display form controlling means 117, in step ST46, displays traffic-jam indicating lines J with a width of 3 dots in a quiet color, for example, ocher which is similar to the color of the background of the map, at the left-hand side of the respective roads in traffic jams on the on-screen map. On the other hand, the display form controlling means 117, in step ST47, displays traffic-jam indicating lines J with a width of 3 dots in dark red at the left-hand side of the respective roads in traffic jams on the on-screen map.

Figure 13A:
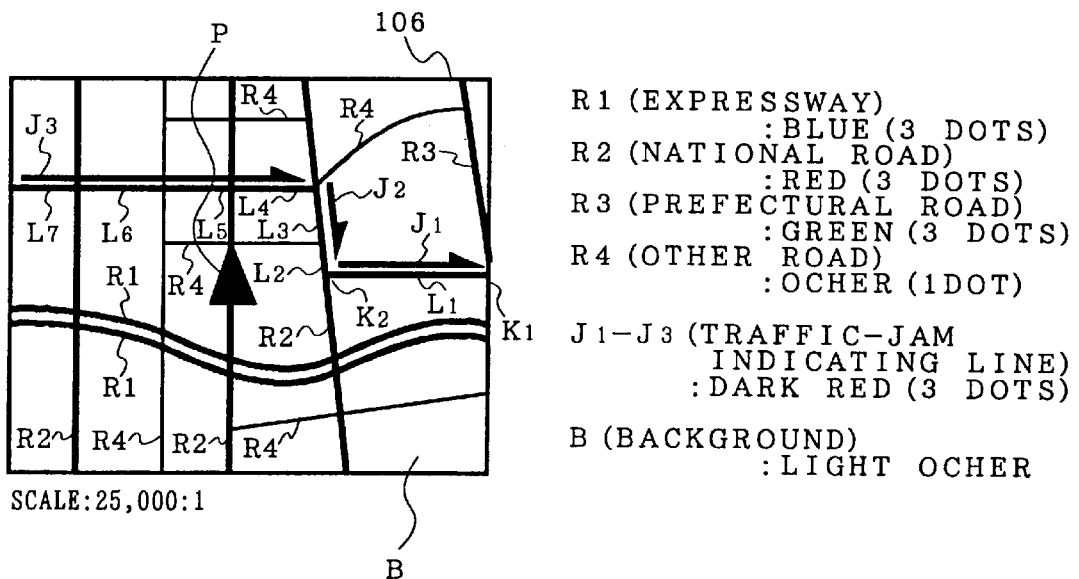
FIGS. 13a and 13b are views showing examples of a display by the navigation device according to the fifth embodiment.
Figure 13B:
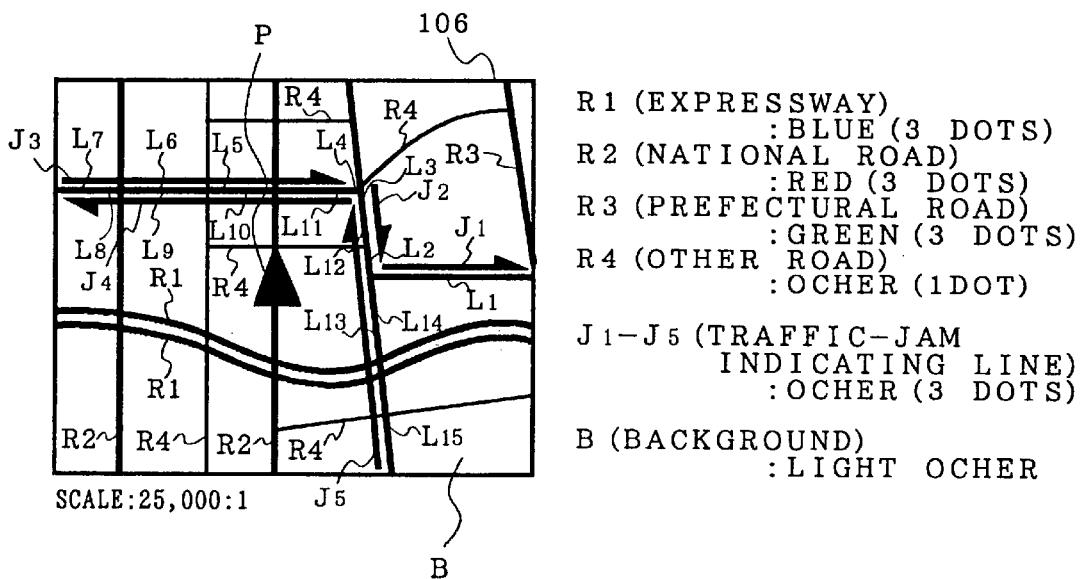

FIG. 13a shows an example of a display in the case where the number of links in traffic jams is smaller than 10, and FIG. 13b shows an example of a display in the case where the number of links in traffic jams is equal to or larger than 10. In the example shown in FIG. 13a, traffic-jam indicating lines J1 to J3 with a width of 3 dots are displayed in dark red together with expressways R1 with a width of 3 dots, national roads R2 with a width of 3 dots, prefectural roads R3 with a width of 3 dots, and other roads R4 with a width of 1 dot, which are respectively displayed in different colors according to the types of the roads. On the contrary, in the example shown in FIG. 13b, traffic-jam indicating lines J1 to J5 with a width of 3 dots are displayed in ocher which is quiet together with expressways R1 with a width of 3 dots, national roads R2 with a width of 3 dots, prefectural roads R3 with a width of 3 dots, and other roads R4 with a width of 1 dot, which are respectively displayed in different colors according to the types of the roads.

Thus, the device changes the colors of traffic-jam indicating lines J displayed on a road map on-screen to a quiet color which is similar to the color of the background of the map when the device receives a lot of information about traffic jams. Therefore, even when a number of traffic-jam indicating lines J are needed to be displayed, such traffic-jam conditions and a road map can be recognized well at the same time with the visibility of the road map on-screen improved.

Figure 14:
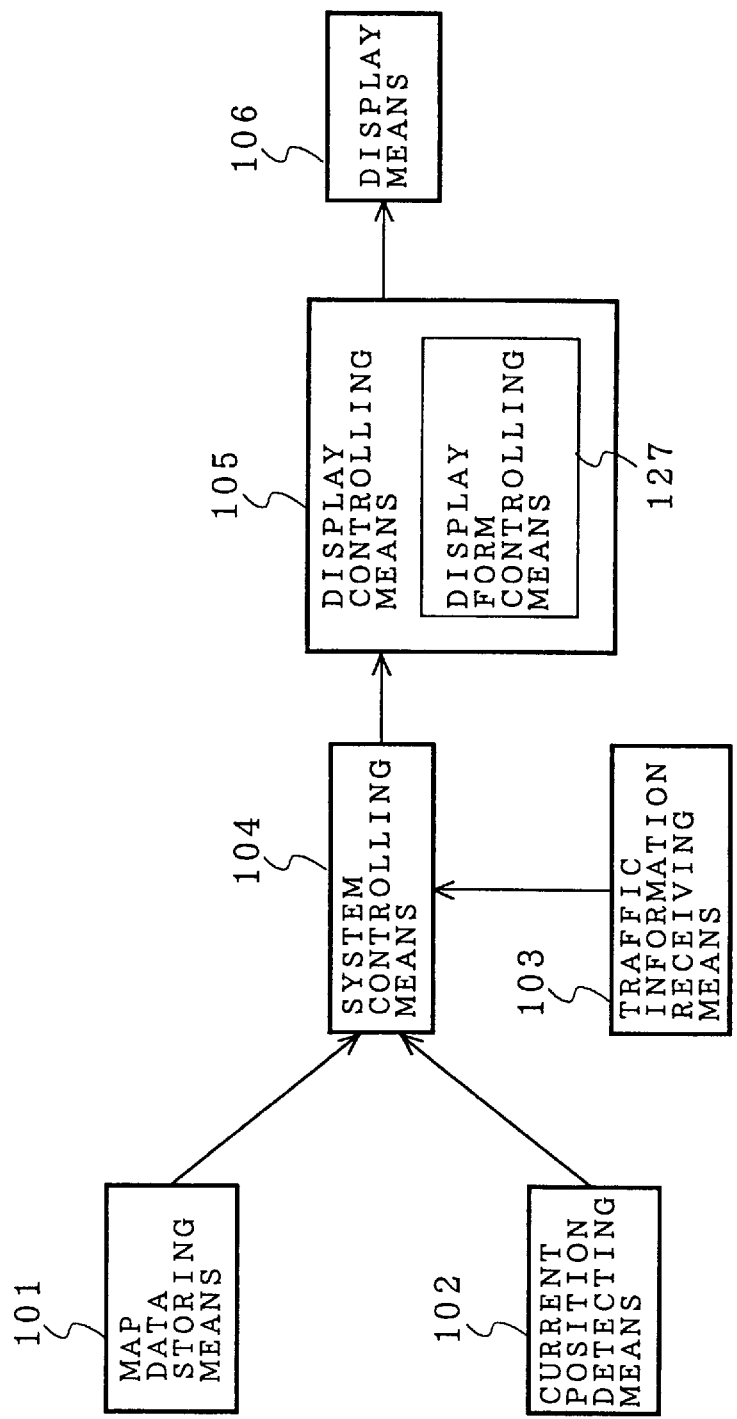
FIG. 14 is a block diagram showing the functional structure of a navigation device according to a sixth embodiment of the present invention.

Next, a description will be made as to a navigation device according to a sixth embodiment of the present invention. FIG. 14 is a block diagram showing the functional structure of the navigation device of the sixth embodiment of the present invention. The same components as those of the navigation device according to the first embodiment are designated by the same reference numerals as those in FIG. 1, and the description about the elements will be omitted hereinafter. In FIG. 14, reference numeral 127 denotes a display form controlling means disposed within the display control means 105, for displaying a traffic-jam indicating line showing a traffic jam along a congested road on a map displayed on the screen of the display means 106 on the basis of traffic information received by the traffic information receiving means 103, and, when the scale of the map displayed on the display means 106 is equal to or smaller than a predetermined scale, changing the display form of all roads displayed on the display screen of the display means 106, i.e., the colors of all the on-screen roads. Since the hardware structure of the device is the same as that of the device according to the first embodiment, the description about the hardware structure will be omitted hereinafter.

Figure 15:
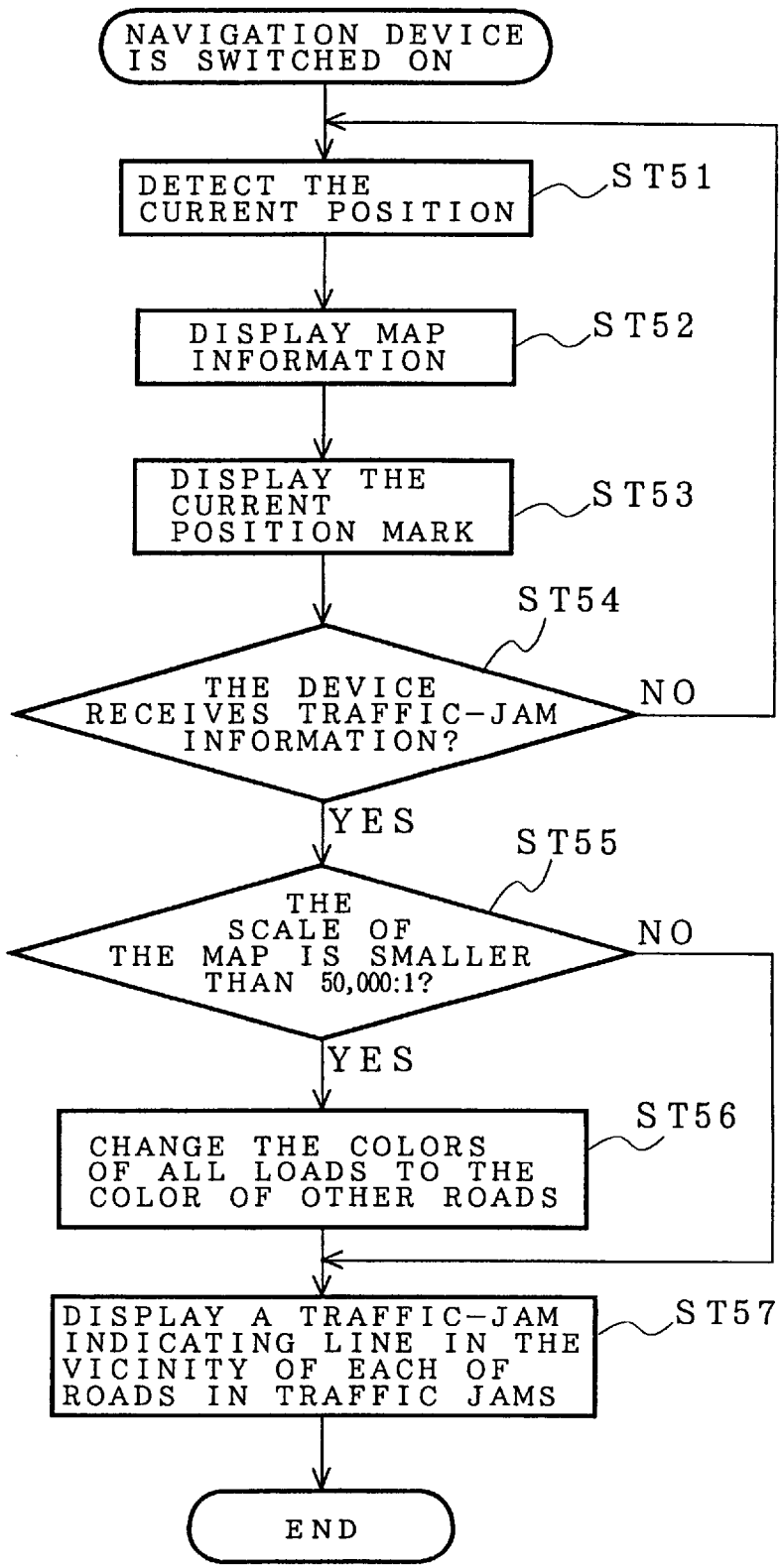
FIG. 15 is a flow chart indicating flow of control by the navigation device according to the sixth embodiment.
Figure 16A:
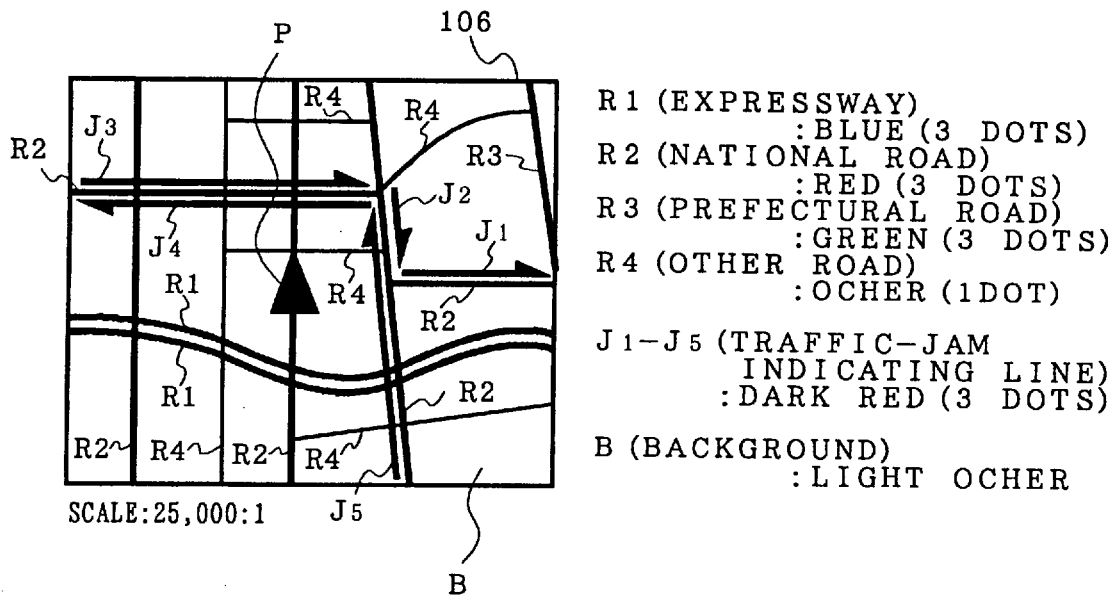
FIGS. 16a and 16b are views showing examples of a display by the navigation device according to the sixth embodiment.
Figure 16B:
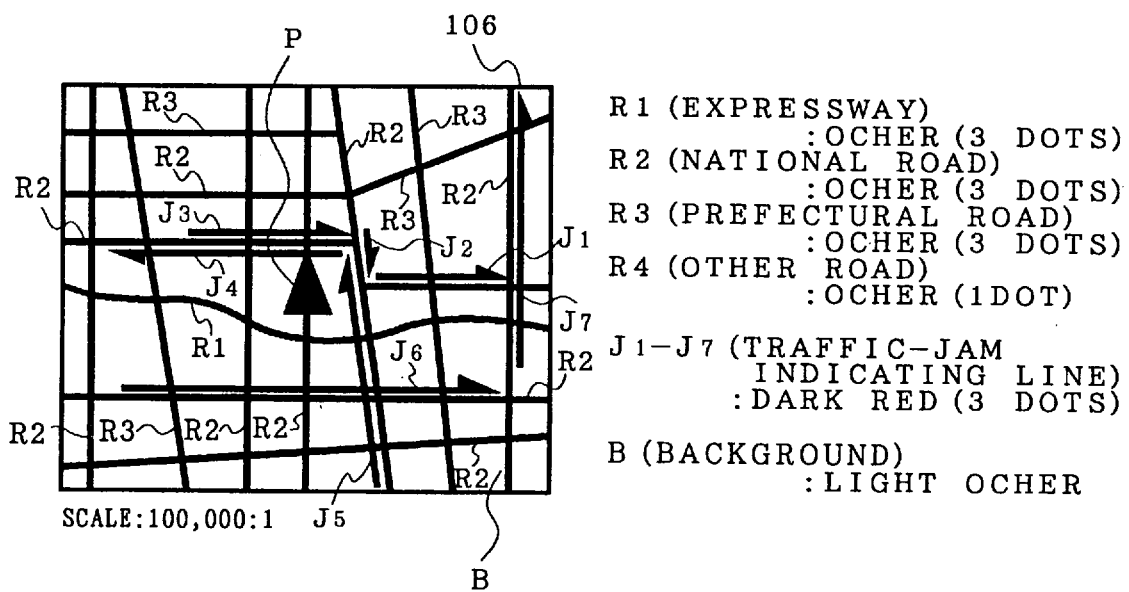

Next, a description will be made as to the operation of the navigation device according to the sixth embodiment. The navigation device of the sixth embodiment is adapted to change the colors of all roads on-screen in accordance with the scale of a road map on-screen. FIG. 15 is a flow diagram indicating flow of control by the navigation device which is so constructed, and FIGS. 16a and 16b are views showing examples of a display screen of the display means 106. The reference characters in FIGS. 16a and 16b respectively denote screen elements which are similar to those in FIGS. 4a and 4b. The operation will be explained hereinafter with reference to FIGS. 15, 16a and 16b.

Like the first embodiment, the navigation device, in step ST51, detects the current position of a vehicle comprising the navigation device by means of the current position detecting means 102 first. Then, the device reads map data in the vicinity of the current position from the map data storing means 101, and displays the road map on the screen of the display means 106 in accordance with display colors and widths predetermined according to the types of roads in such a manner that expressways R1 are colored blue and are 3 dots wide, national roads R2 are colored red and are 3 dots wide, prefectural roads R3 are colored green and are 3 dots wide, and other roads R4 are colored ocher and are 1 dot wide, in step ST52. Next, the display controlling means 105, in step ST53, displays the current position mark P at a position on the on-screen map which corresponds to the current position detected in step ST 51.

Then, the device, in step ST54, determines whether or not the traffic information receiving means 103 has received traffic-jam information. When the device determines that the traffic information receiving means 103 has not received traffic-jam information yet, the device returns to step ST51 and repeats the operations in steps ST51 to ST54. On the contrary, when the device determines that the traffic information receiving means 103 has received traffic-jam information, the device advances to step ST55. The display form controlling means 127, in step ST55, determines whether or not the scale of the road map displayed on the screen of the display means 106 is smaller than a predetermined scale, for example, a scale of 50,000:1. When the display form controlling means 127 determines that the scale of the map is smaller than a scale of 50,000:1, it proceeds to step ST56. On the contrary, when the display form controlling means 127 determines that the scale of the map is not smaller than a scale of 50,000:1, it proceeds to step ST57. After that, the same processes as in the case of the first embodiment are carried out.

That is, the display form controlling means 127, in step ST56, changes the colors of all the on-screen roads color-coded according to the types of the roads to ocher which is quiet as compared with the color of the background B, and recreates the map on the screen of the display means 106. Then, the display form controlling means 127 advances to step ST57. The display form controlling means 127, in step ST57, displays traffic-jam indicating lines J with a width of 3 dots in dark red at the left-hand side of the respective congested roads on the map displayed on the screen of the display mean 106 with respect to the direction in which the vehicle is to be headed, respectively. The series of processes is thus completed.

FIG. 16a shows an example of a display in the case where the scale of a map displayed on the screen of the display means 106 is equal to or larger than a scale of 50,000:1. All roads are displayed together with dark red traffic-jam indicating lines J1 to J5 with a width of 3 dots, such that expressways R1 are colored blue and are 3 dots wide, national roads R2 are colored red and are 3 dots wide, prefectural roads R3 are colored green and are 3 dots wide, and other roads R4 are colored ocher and are 1 dot wide. On the contrary, FIG. 16b shows an example of a display in the case where the scale of a map on-screen is smaller than a scale of 50,000:1. In this case, all roads are displayed together with dark red traffic-jam indicating lines J1 to J7 with a width of 3 dots, such that expressways R1, national roads R2, and prefectural roads R3 are colored ocher and are 3 dots wide, and other roads R4 are colored ocher and are 1 dot wide.

As mentioned above, the device changes the colors of all roads in a road map on-screen to a quiet color when the scale of the road map is smaller than a predetermined scale. Therefore, even when the scale of a map on-screen is small and a number of traffic-jam indicating lines J are needed to be displayed, the traffic-jam indicating lines J can be displayed prominently. Thereby, such traffic-jam conditions can be recognized with the visibility of a road map on-screen improved.

Next, a description will be made as to a navigation device according to a seventh embodiment of the present invention.

Figure 17:
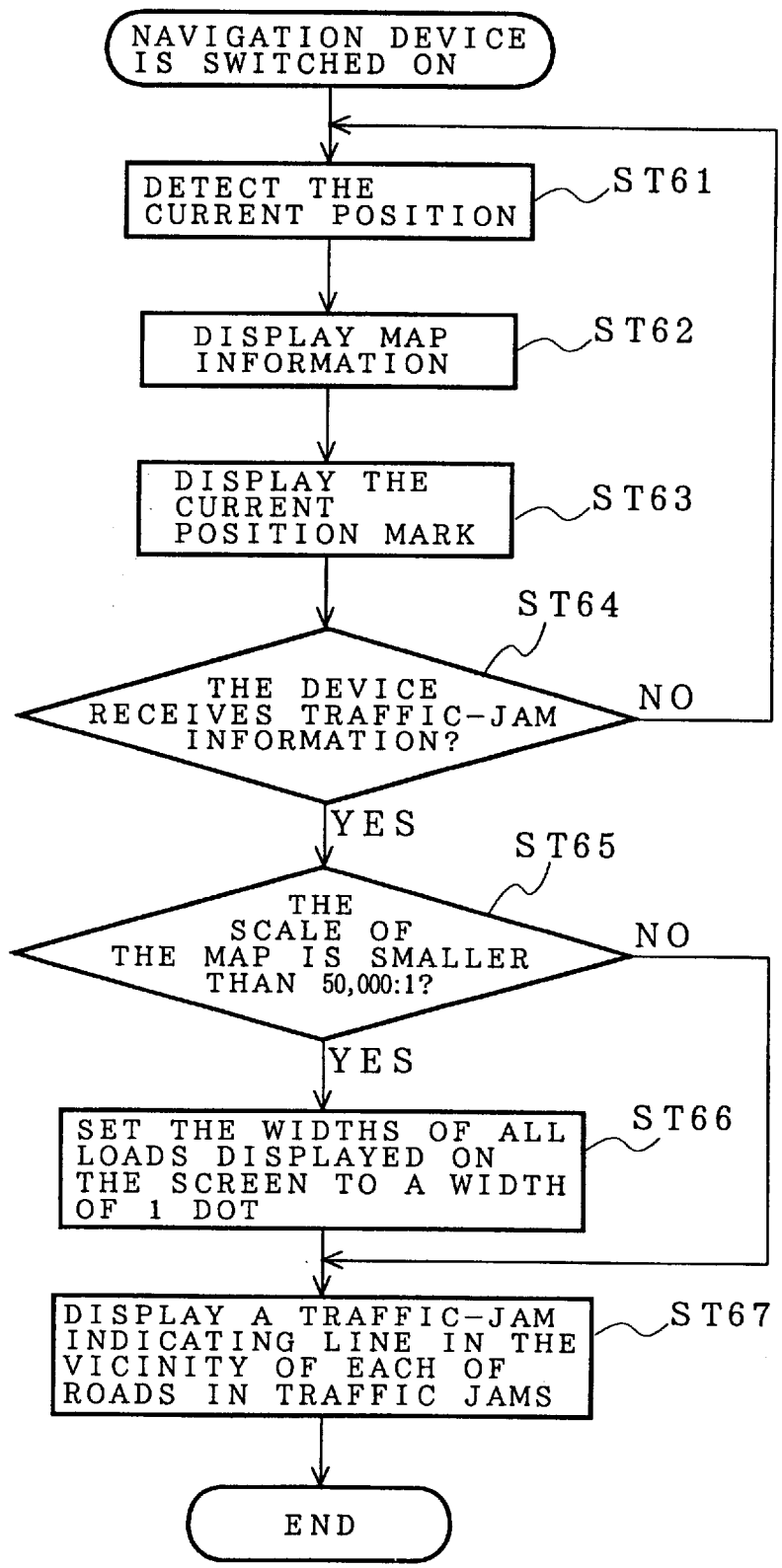
FIG. 17 is a flow chart indicating flow of control by a navigation device according to a seventh embodiment of the present invention.

As previously mentioned, the device according to the aforementioned sixth embodiment changes the colors of all roads on a map on-screen to a quiet color as compared with the color of the background on the map when the scale of the on-screen road map is smaller than a predetermined value. In contrast to the sixth embodiment, the device of the seventh embodiment is adapted to reduce the widths of all on-screen roads instead of changing the colors of all the on-screen roads. FIG. 17 is a flow diagram indicating flow of control by the navigation device of the seventh embodiment, and FIGS. 18a and 18b are views showing examples of a display screen of the display means 106.

Next, a description will be made as to the operation of the navigation device according to the seventh embodiment. The processes of steps ST61 to ST65 are the same as those of steps ST51 to ST55 shown in FIG. 15 in the sixth embodiment, and the description of the processes will be omitted hereinafter. When the display form controlling means 127, in step ST65, determines that the scale of a map displayed on the screen of the display means 106 is smaller than a predetermined scale, e.g., a scale of 50,000:1, it proceeds to step ST66. On the contrary, when the display form controlling means 127 determines that the scale of the map is equal to or larger than a scale of 50,000:1, it proceeds to step ST67. The display form controlling means 127, in step ST66, changes the widths of all the on-screen roads displayed in step ST62 and predetermined according to the types of the roads to an identical width of 1 dot, and recreates the map on the screen of the display means 106. Then, the display form controlling means 127 advances to step ST67. Like the sixth embodiment, the display form controlling means 127, in step ST67, displays traffic-jam indicating lines J in the vicinity of roads in traffic jams on the on-screen map displayed on the display means 106, respectively. The series of processes is thus completed.

Figure 18A:
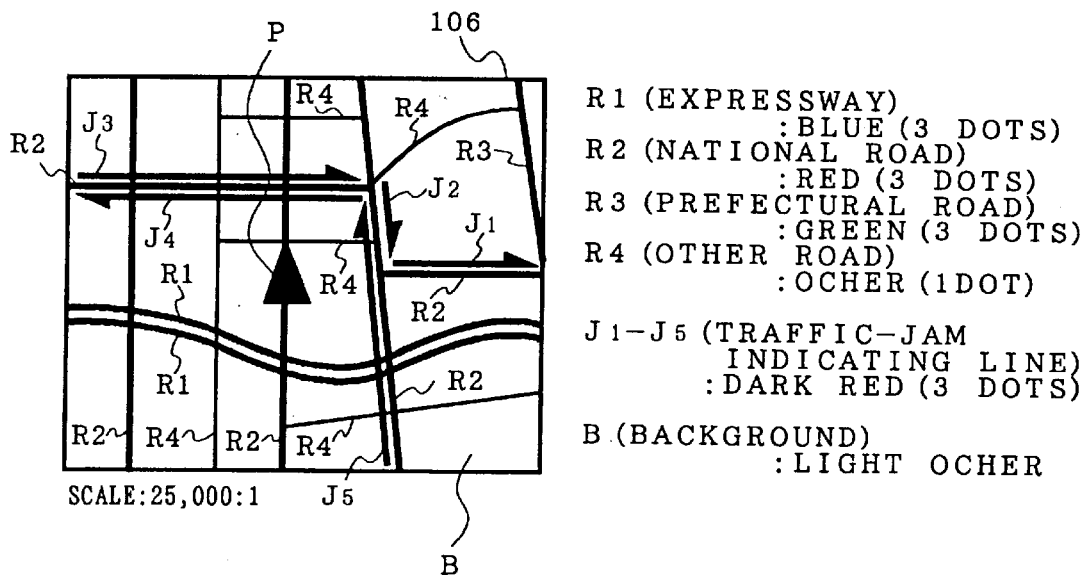
FIGS. 18a and 18b are views showing examples of a display by the navigation device according to the seventh embodiment.
Figure 18B:
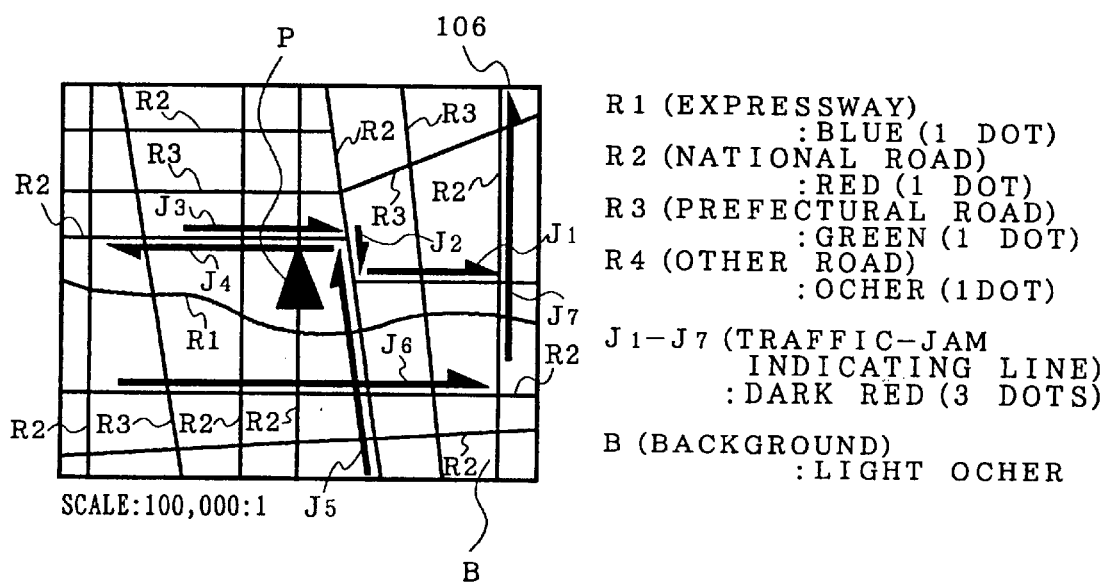

FIG. 18a shows an example of a display in the case where the scale of a map on-screen is equal to or larger than a scale of 50,000:1, and FIG. 18b shows an example of a display in the case where the scale of a map on-screen is smaller than a scale of 50,000:1. In the example shown in FIG. 18a, all roads are displayed together with dark red traffic-jam indicating lines J1 to J5 with a width of 3 dots, such that expressways R1 are colored blue and are 3 dots wide, national roads R2 are colored red and are 3 dots wide, prefectural roads R3 are colored green and are 3 dots wide, and other roads R4 are colored ocher and are 1 dot wide. On the contrary, in the example shown in FIG. 18b, all roads are displayed together with dark red traffic-jam indicating lines J1 to J7 with a width of 3 dots, such that expressways R1 are colored blue, national roads R2 are colored red, prefectural roads R3 are colored green, other roads R4 are colored ocher, and all the roads are 1 dot wide.

As mentioned above, the device reduces the widths of all roads in a road map on-screen when the scale of the road map is smaller than a predetermined scale. Therefore, even when the scale of a map on-screen is small and a number of traffic-jam indicating lines J are needed to be displayed, the traffic-jam indicating lines J can be displayed prominently. Thereby, such traffic-jam conditions can be recognized with the visibility of a road map on-screen improved.

Figure 19:
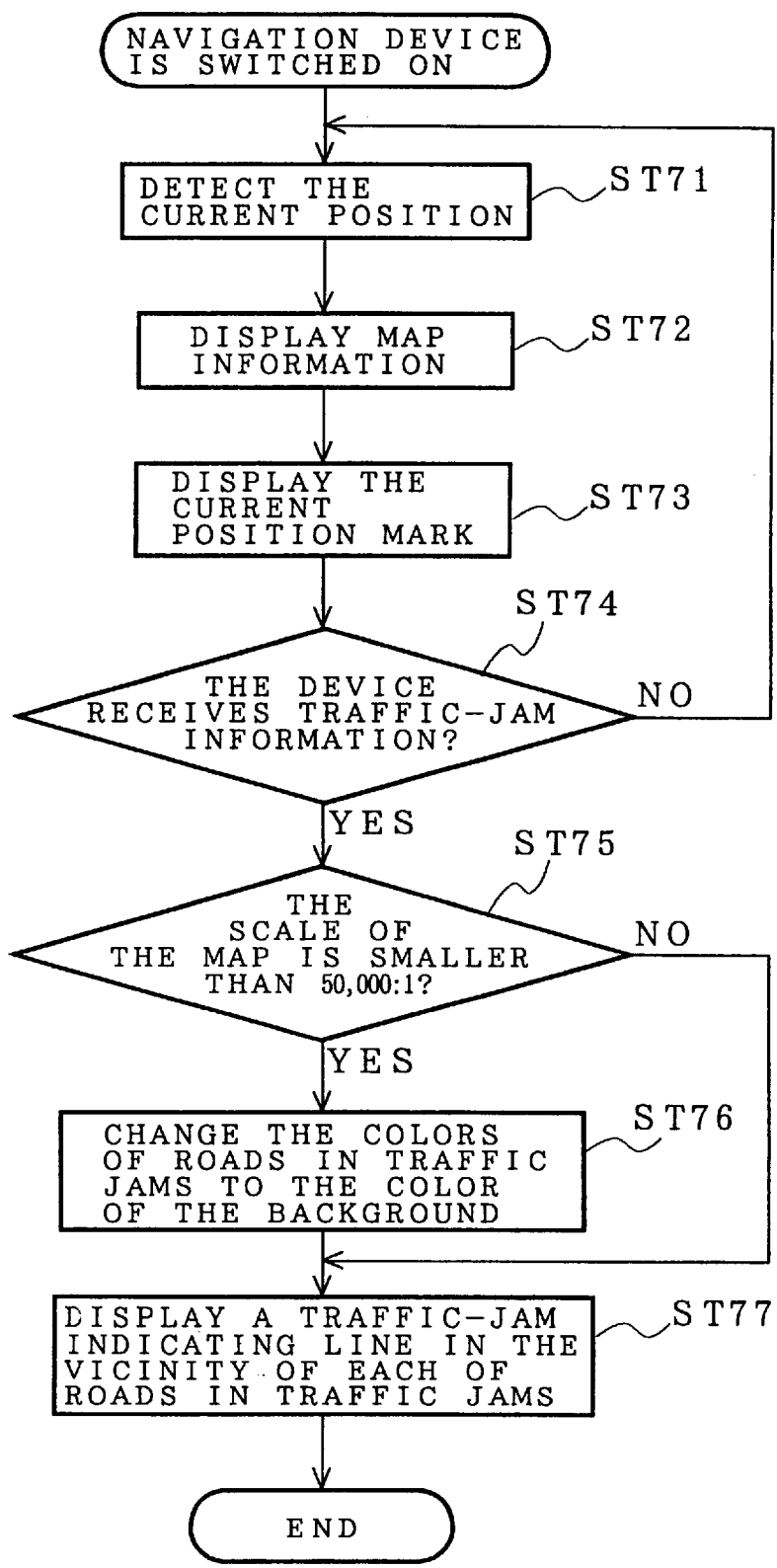
FIG. 19 is a flow chart indicating flow of control by a navigation device according to a eighth embodiment of the present invention.

Next, a description will be made as to a navigation device according to a eighth embodiment of the present invention. As previously mentioned, the device according to the aforementioned sixth or seventh embodiment changes the colors or widths of all roads on a map on-screen when the scale of a road map on-screen is smaller than a predetermined scale. In contrast to the sixth and seventh embodiments, the device of the eighth embodiment is adapted to change the colors of only on-screen roads in traffic jams to a color which is identical to the color of the background of the map instead of changing the colors or widths of all roads on-screen. FIG. 19 is a flow diagram indicating flow of control by the navigation device of the eighth embodiment, and FIGS. 20a and 20b are views showing examples of a display screen of the display means 106.

Next, a description will be made as to the operation of the navigation device according to the eighth embodiment. The processes of steps ST71 to ST75 are the same as those of steps ST51 to ST55 shown in FIG. 15 in the sixth embodiment, and the description of the processes will be omitted hereinafter. When the display form controlling means 127, in step ST75, determines that the scale of a road map on-screen is smaller than a predetermined scale, i.e., a scale of 50,000:1, it proceeds to step ST76. On the contrary, when the display form controlling means 127 determines that the scale of a road map on-screen is not smaller than the predetermined scale, it proceeds to step ST77. The display form controlling means 127, in step ST76, changes the colors of on-screen roads in traffic jams displayed in step ST72 to light ocher which is the same as that of the background B of the map, and recreates the map on the screen of the display means 106. Then, the display form controlling means 127 advances to step ST77. Like the sixth embodiment, the display form controlling means 127, in step ST77, displays traffic-jam indicating lines J in the vicinity of roads in traffic jams on the on-screen map displayed on the display means 106, respectively. The series of processes is thus completed.

Figure 20A:
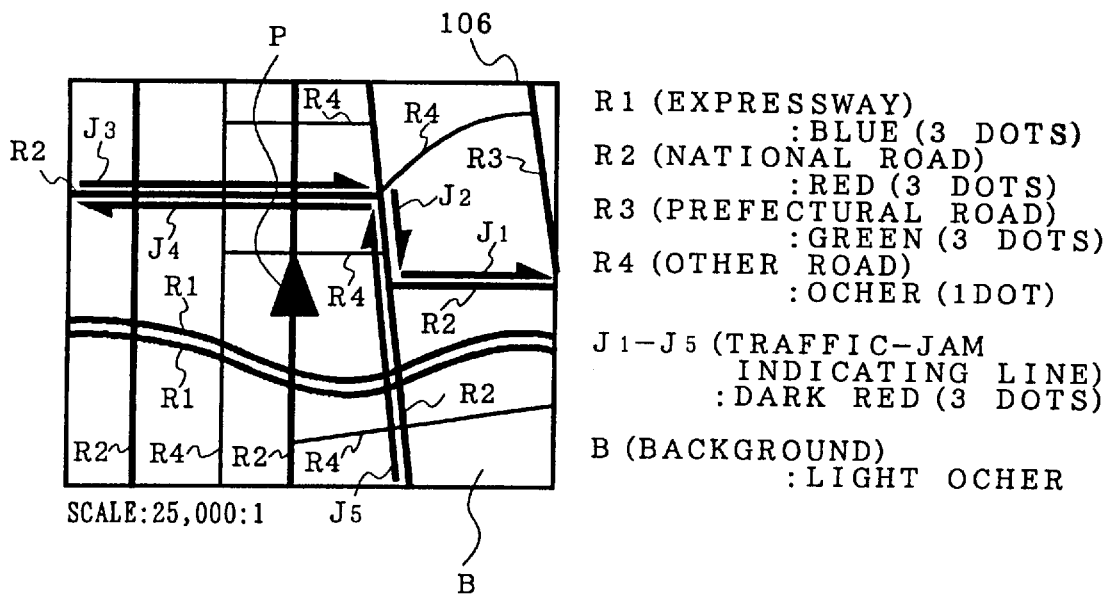
FIGS. 20a and 20b are views showing examples of a display by the navigation device according to the eighth embodiment.
Figure 20B:
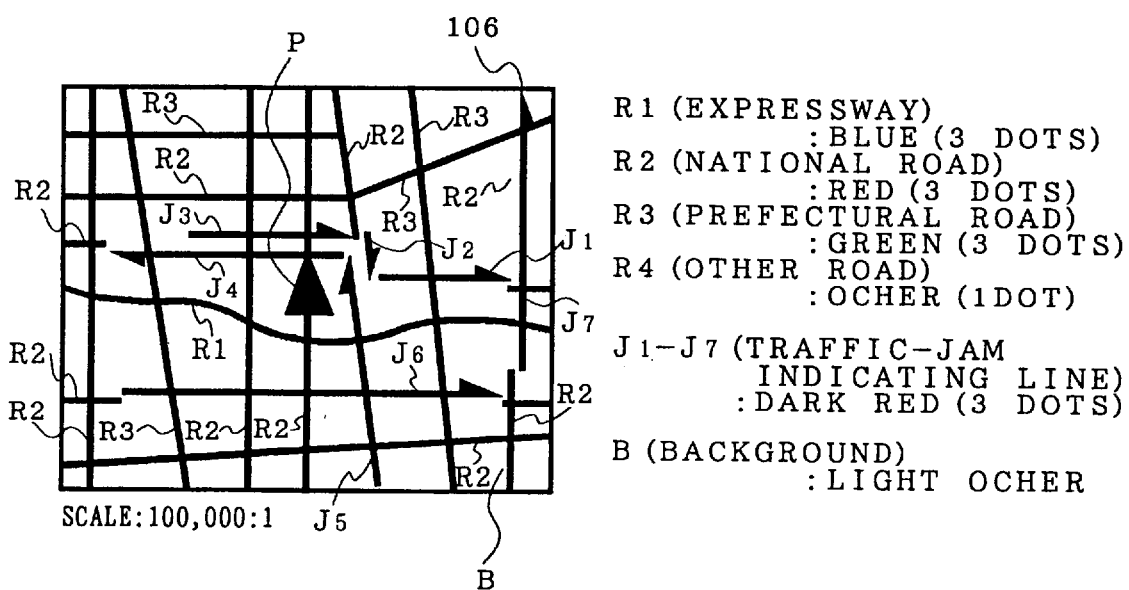

FIG. 20a shows an example of a display in the case where the scale of a map on-screen is equal to or larger than a scale of 50,000:1, and FIG. 20b shows an example of a display in the case where the scale of a map on-screen is smaller than a scale of 50,000:1. In the example shown in FIG. 20a, roads in traffic jams are also displayed in different colors predetermined according to the types of the congested roads. On the contrary, in the example shown in FIG. 20b, roads in traffic jams disappear because the colors of the roads is changed to the color of the background B, and hence only traffic-jam indicating lines J1 to J7 can be seen along the roads in traffic jams which can be no longer seen.

As mentioned above, the device makes all roads in traffic jams on a road map on-screen become invisible by changing the colors of the congested roads to the same color as the background of the map when the scale of the on-screen road map is small. Therefore, even when the scale of a map on-screen is small and a number of traffic-jam indicating lines J are needed to be displayed, the traffic-jam indicating lines J can be displayed prominently. Thereby, such traffic-jam conditions can be recognized with the visibility of a road map on-screen improved.

Figure 21:
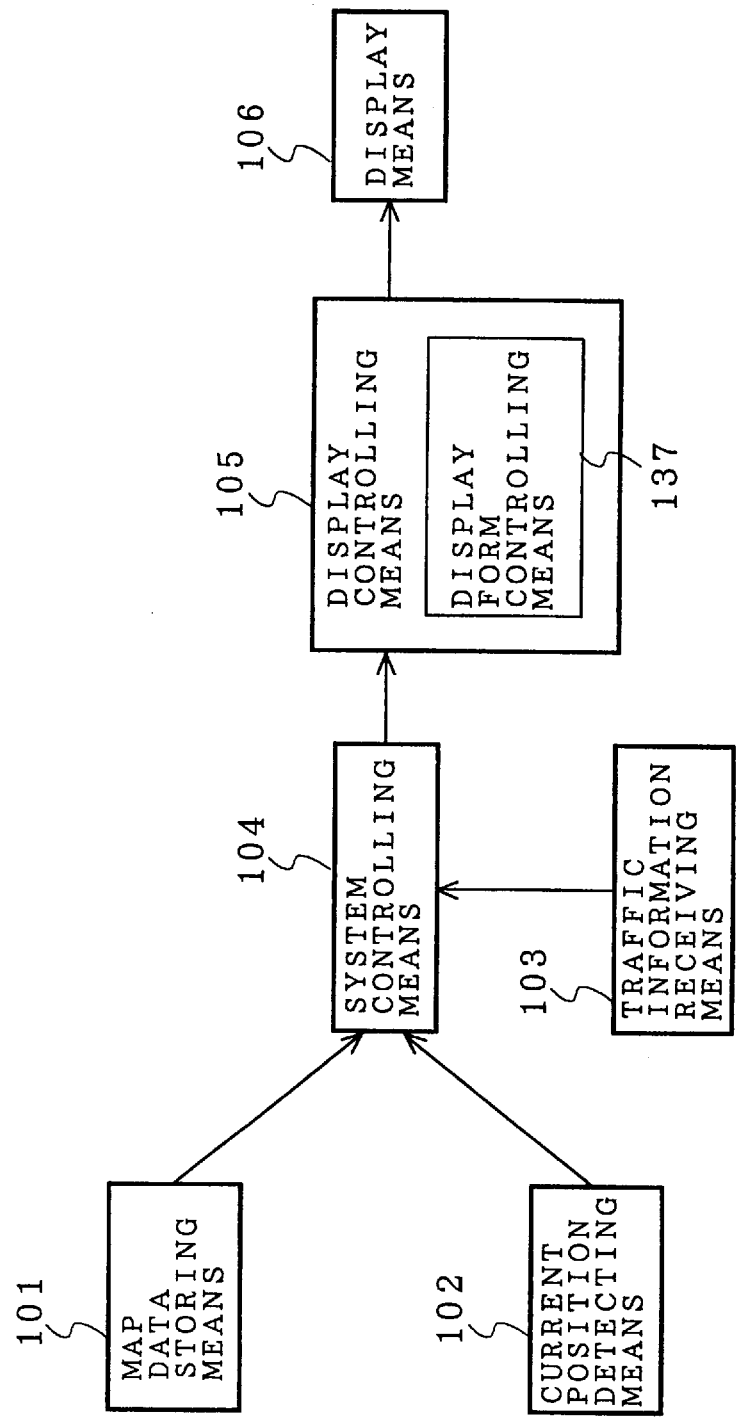
FIG. 21 is a block diagram showing the functional structure of a navigation device according to a ninth embodiment of the present invention.

Next, a description will be made as to a navigation device according to a ninth embodiment of the present invention. FIG. 21 is a block diagram showing the functional structure of the navigation device of the ninth embodiment of the present invention. The same components as those of the navigation device according to the first embodiment are designated by the same reference numerals as those in FIG. 1, and the description about the elements will be omitted hereinafter. In FIG. 21, reference numeral 137 denotes a display form controlling means disposed within the display control means 105, for displaying a traffic-jam indicating line showing a traffic jam along a congested road on a map displayed on the display means 106 on the basis of traffic information received by the traffic information receiving means 103, and, when the scale of the map displayed on the display means 106 is smaller than a predetermined value, changing the display form of traffic-jam indicating lines displayed on the display screen of the display means 106, i.e., the width of the on-screen traffic-jam indicating lines. Since the hardware structure of the device is the same as that of the device according to the first embodiment, the description about the hardware structure will be omitted hereinafter.

Figure 23A:
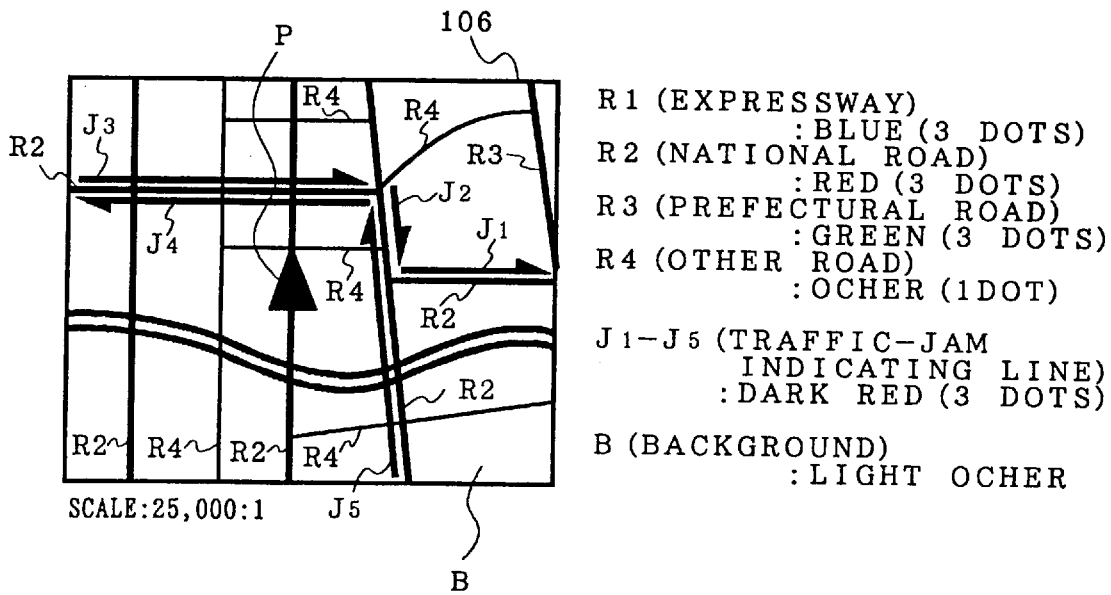
FIGS. 23a and 23b are views showing examples of a display by the navigation device according to the ninth embodiment.
Figure 23B:
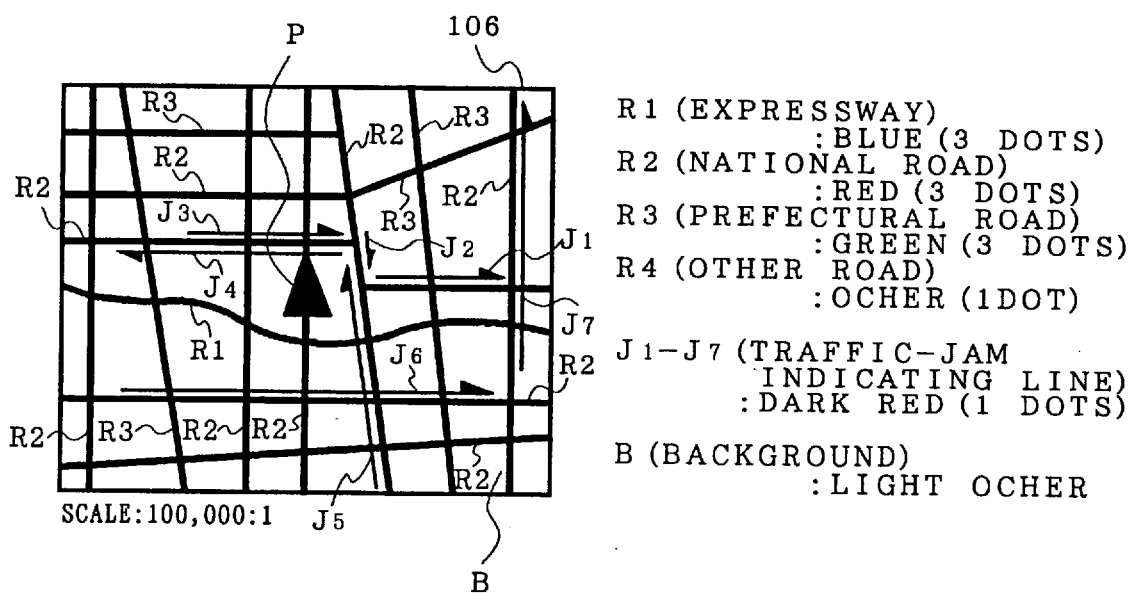

Next, a description will be made as to the operation of the navigation device according to the ninth embodiment. The navigation device of the ninth embodiment is adapted to change the display form of traffic-jam indicating lines, i.e., the widths of the on-screen traffic-jam indicating lines, in accordance with the scale of a road map on-screen. FIG. 22 is a flow diagram indicating flow of control by the navigation device which is so constructed, and FIGS. 23a and 23b are views showing examples of a display screen of the display means 106. The reference characters in FIGS. 23a and 23b respectively denote screen elements which are similar to those in FIGS. 4a and 4b. The operation will be explained hereinafter with reference to FIGS. 22, 23a and 23b.

Like the sixth embodiment, the navigation device, in step ST81, detects the current position of a vehicle comprising the navigation device by means of the current position detecting means 102 first. Then, the device reads map data in the vicinity of the current position from the map data storing means 101, and displays the road map on the screen of the display means 106 in accordance with display colors and widths predetermined according to the types of roads, in step ST82. Next, the display controlling means 105, in step ST83, displays the current position mark P at a position on the on-screen map which corresponds to the current position detected in step ST 81. Then, the device, in step ST84, determines whether or not the traffic information receiving means 103 has received traffic-jam information. When the device determines that the traffic information receiving means 103 has not received traffic-jam information yet, the device returns to step ST81 and repeats the operations in steps ST81 to ST84. On the contrary, when the device determines that the traffic information receiving means 103 has received traffic-jam information, the device advances to step ST85.

The display form controlling means 137, in step ST85, determines whether or not the scale of the road map displayed on the screen of the display means 106 is smaller than a predetermined scale, for example, a scale of 50,000:1. When the display form controlling means 137 determines that the scale of the map is smaller than a scale of 50,000:1, it proceeds to step ST86. On the contrary, when the display form controlling means 117 determines that the scale of the map is not smaller than a scale of 50,000:1, it proceeds to step ST87. The display form controlling means 137, in step ST86, displays traffic-jam indicating lines J with a width of 1 dot in dark red at the left-hand sides of the respective congested roads on the map displayed on the screen of the display mean 106 with respect to the direction in which the vehicle is to be headed, on the basis of the traffic-jam information received by the traffic information receiving means 103. On the other hand, the display form controlling means 137, in step ST87, displays traffic-jam indicating lines J with a width of 3 dots in dark red at the left-hand sides of the respective congested roads on the map displayed on the screen of the display mean 106 with respect to the direction in which the vehicle is to be headed, on the basis of the traffic-jam information. The series of processes is thus completed.

FIG. 23a shows an example of a display in the case where the scale of a map displayed on the screen of the display means 106 is equal to or larger than a scale of 50,000:1. In this case, traffic-jam indicating lines J1 to J5 with a width of 3 dots are displayed in dark red together with expressways R1 with a width of 3 dots colored blue, national roads R2 with a width of 3 dots colored red, prefectural roads R3 with a width of 3 dots colored green, and other roads R4 with a width of 1 dot colored ocher. On the contrary, FIG. 23b shows an example of a display in the case where the scale of a map displayed on the screen of the display means 106 is smaller than a scale of 50,000:1, and traffic-jam indicating lines J1 to J7 with a width of 1 dot are displayed in dark red together with expressways R1 with a width of 3 dots, national roads R2 with a width of 3 dots, prefectural roads R3 with a width of 3 dots, and other roads R4 with a width of 1 dot, which are displayed in different colors according to the types of the roads.

As mentioned above, the device reduces the widths of traffic-jam indicating lines J displayed on a road map on-screen when the scale of the map is smaller than a predetermined scale. Therefore, even when the scale of a map is small and a number of traffic-jam indicating lines J are needed to be displayed, such traffic-jam conditions and a road map can be recognized well at the same time with the visibility of the on-screen road map improved.

Figure 24:
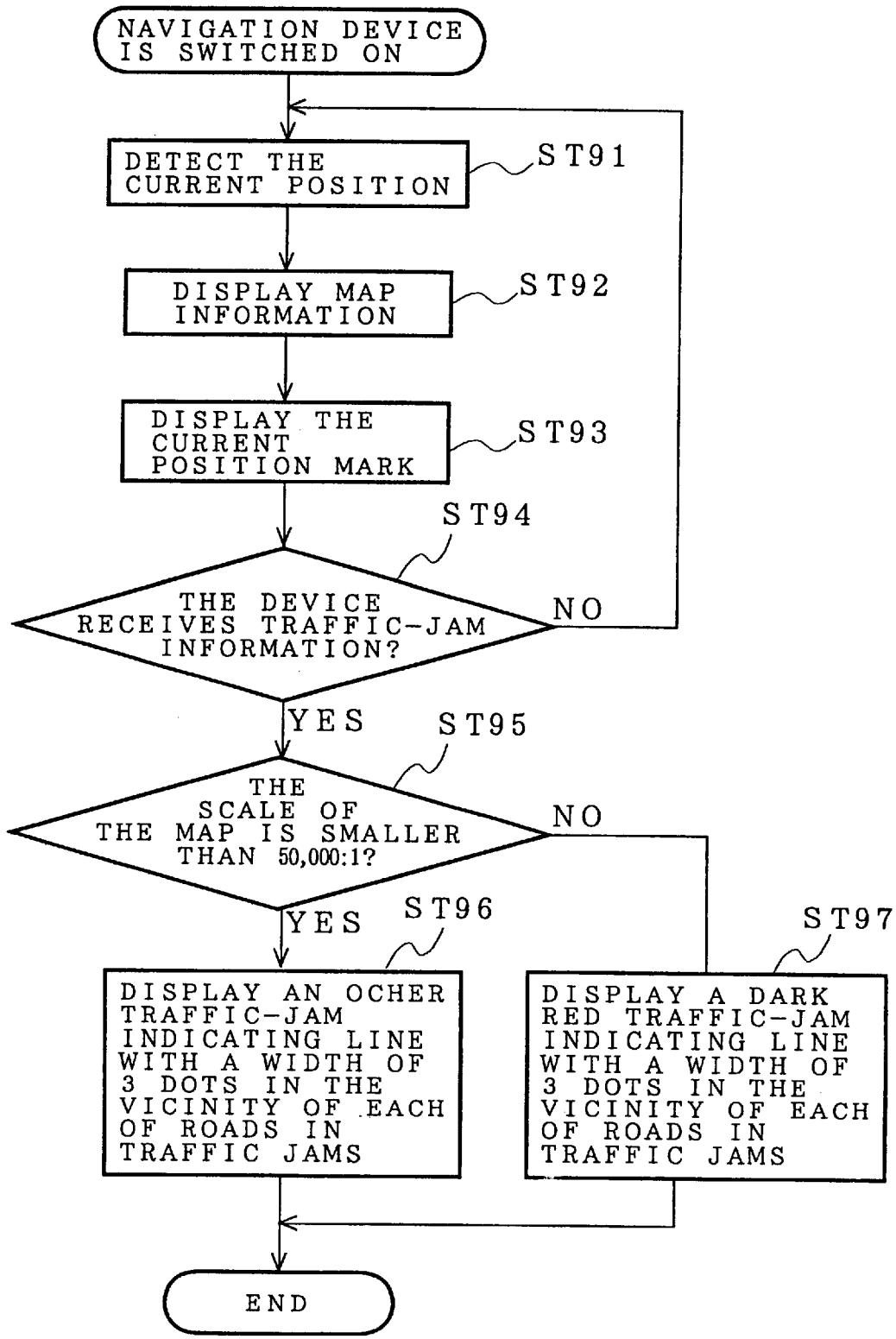
FIG. 24 is a flow chart indicating flow of control by a navigation device according to a tenth embodiment of the present invention.

Next, a description will be made as to a navigation device according to a tenth embodiment of the present invention. As previously mentioned, the device according to the aforementioned ninth embodiment changes the widths of traffic-jam indicating lines on-screen when the scale of a road map is smaller than a predetermined scale. In contrast to the ninth embodiment, the device of the tenth embodiment is adapted to change the colors of traffic-jam indicating lines on-screen to a quiet color instead of changing the widths of the traffic-jam indicating lines on-screen. FIG. 24 is a flow diagram indicating flow of control by the navigation device of the tenth embodiment, and FIGS. 25a and 25b are views showing examples of a display screen of the display means 106.

Next, a description will be made as to the operation of the navigation device according to the tenth embodiment. The processes of steps ST91 to ST95 are the same as those of steps ST81 to ST85 shown in FIG. 22 in the ninth embodiment, and the description of the processes will be omitted hereinafter. When the display form controlling means 137, in step ST95, determines that the scale of a road map on-screen is smaller than a scale of 50,000:1, it proceeds to step ST96. On the contrary, when the display form controlling means 137 determines that the scale of a road map on-screen is equal to or larger than a scale of 50,000:1, it proceeds to step ST97. The display form controlling means 137, in step ST96, displays traffic-jam indicating lines J with a width of 3 dots in a quiet color, for example, ocher which is similar to the color of the background of the map, at the left-hand sided of the respective roads in traffic jams on the on-screen map. On the other hand, the display form controlling means 137, in step ST97, displays traffic-jam indicating lines J with a width of 3 dots in dark red at the left-hand sides of the respective roads in traffic jams on the on-screen map.

Figure 25A:
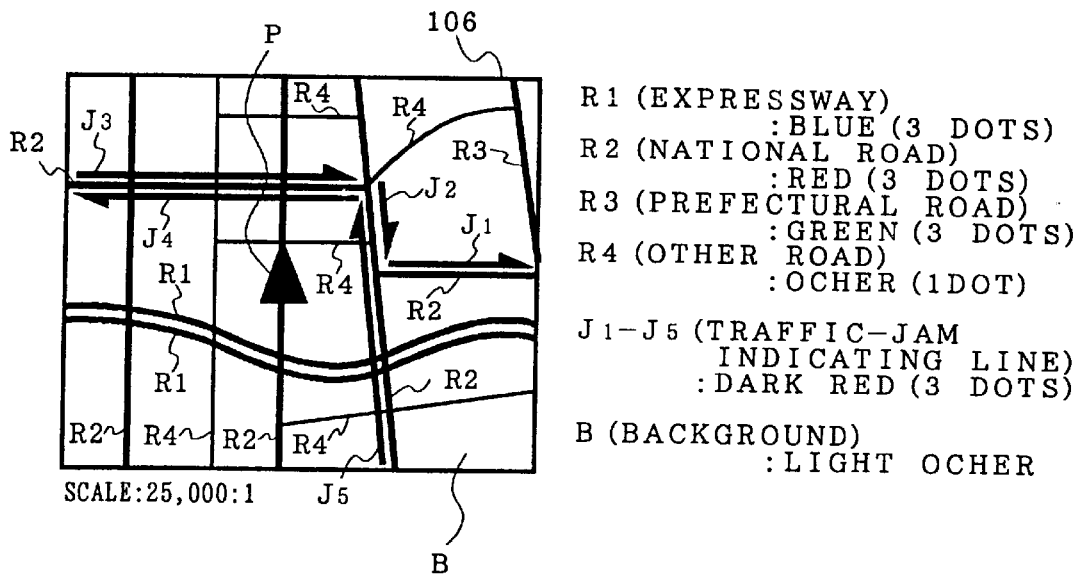
FIGS. 25a and 25b are views showing examples of a display by the navigation device according to the tenth embodiment.
Figure 25B:
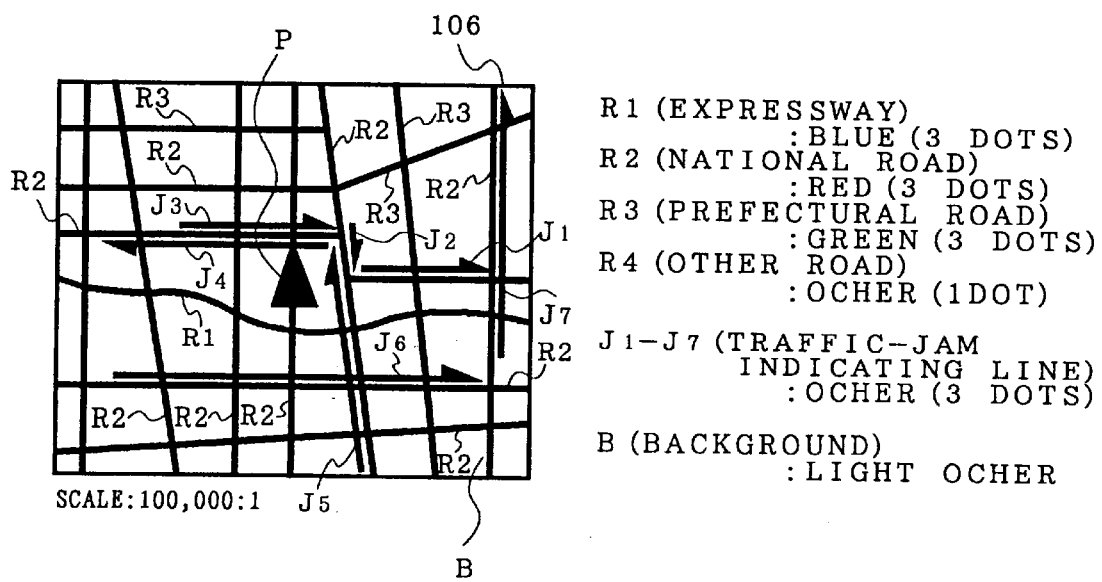
Figure 26:
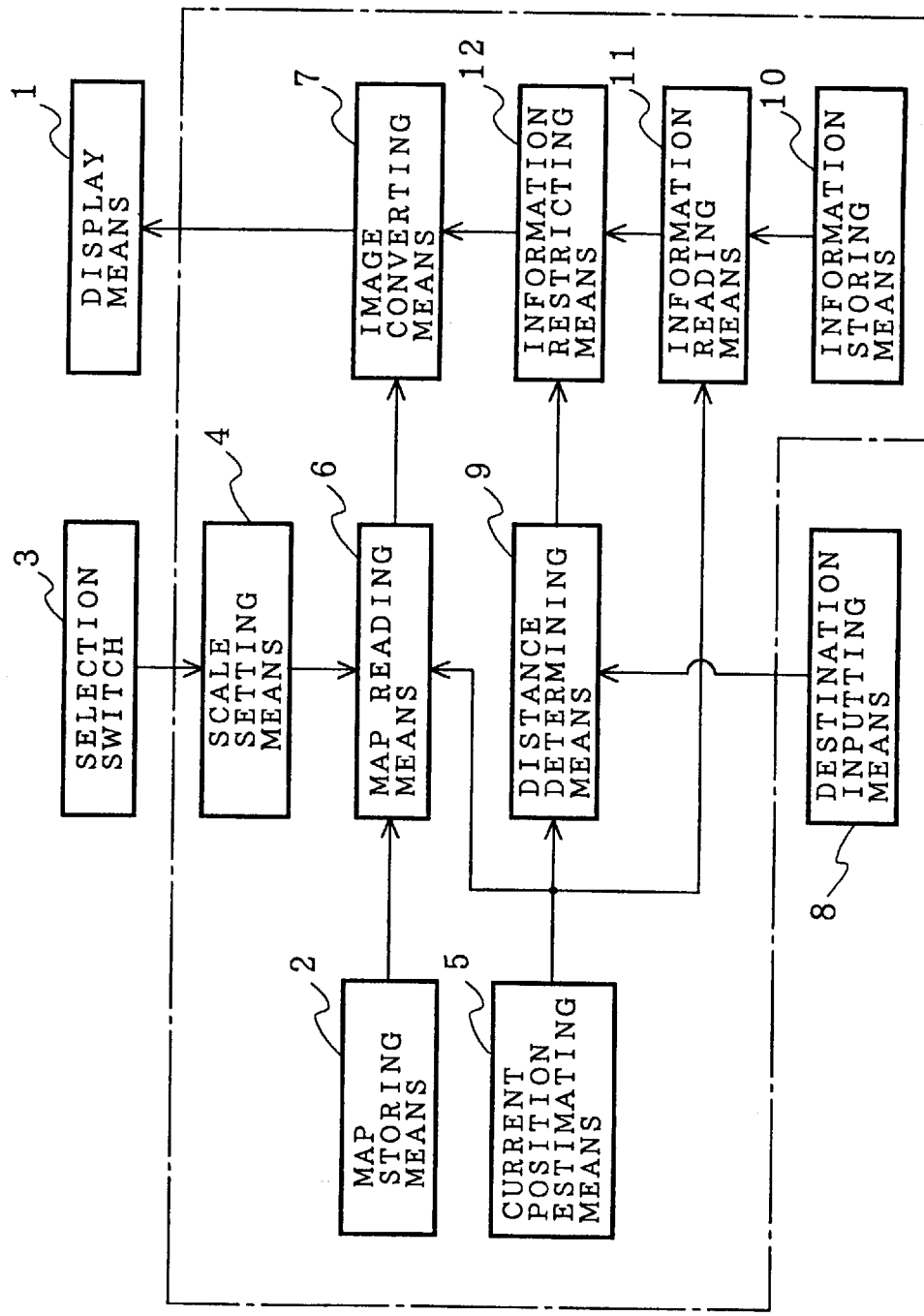
FIG. 26 is a block diagram showing the structure of a prior art navigation device.
Figure 27:
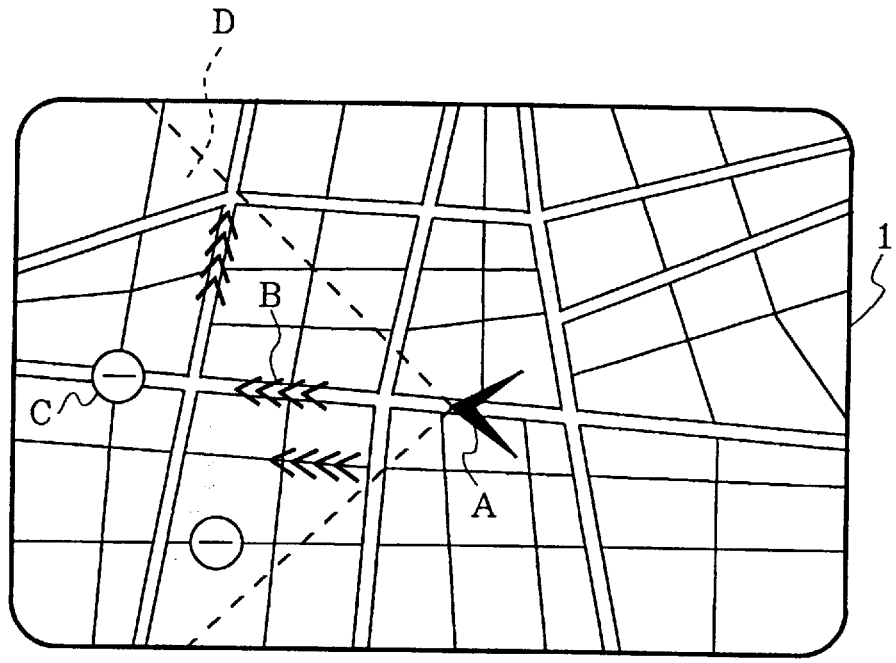
FIG. 27 is a view showing an example of a screen display by the prior art navigation device.
Figure 28:
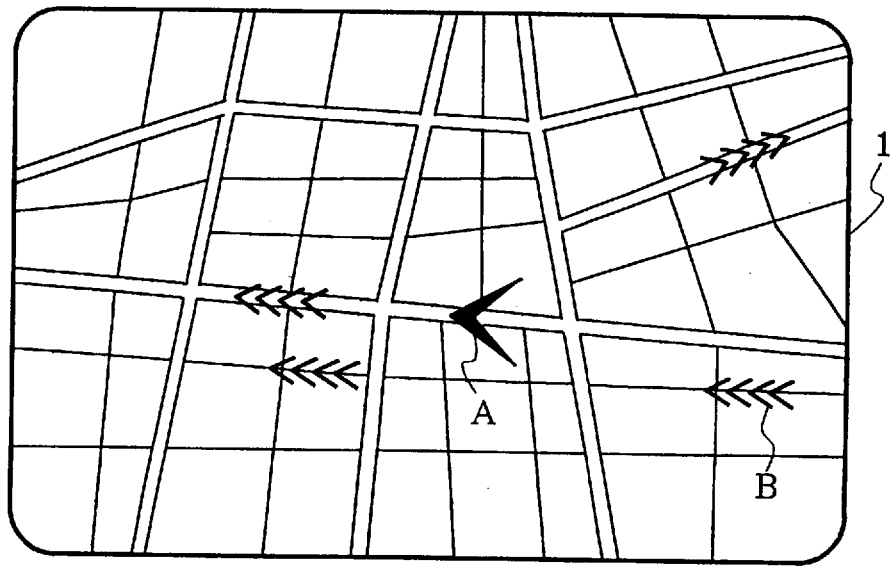
FIG. 28 is a view showing an example of a screen display by the prior art navigation device.
Figure 29:
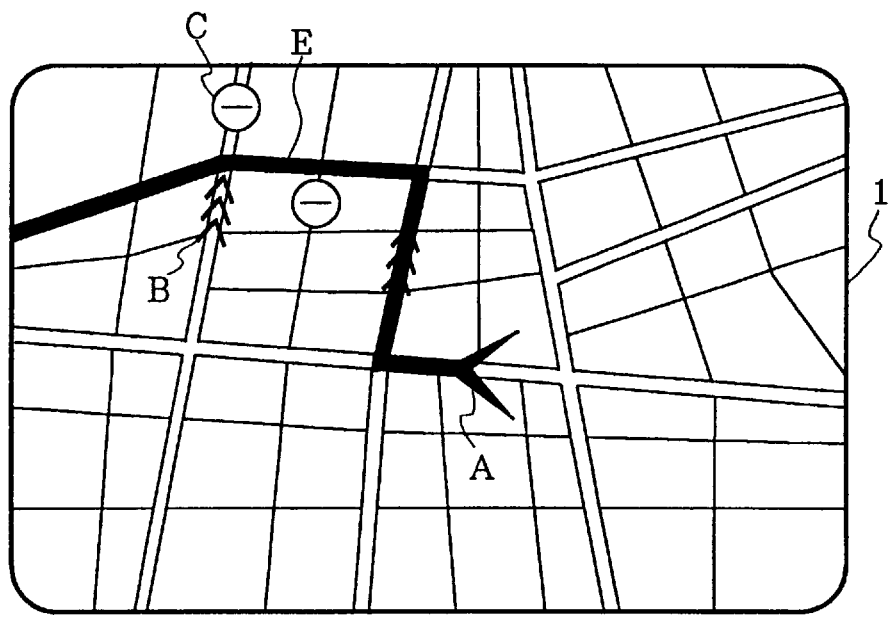
FIG. 29 is a view showing an example of a screen display by the prior art navigation device.
Figure 30:
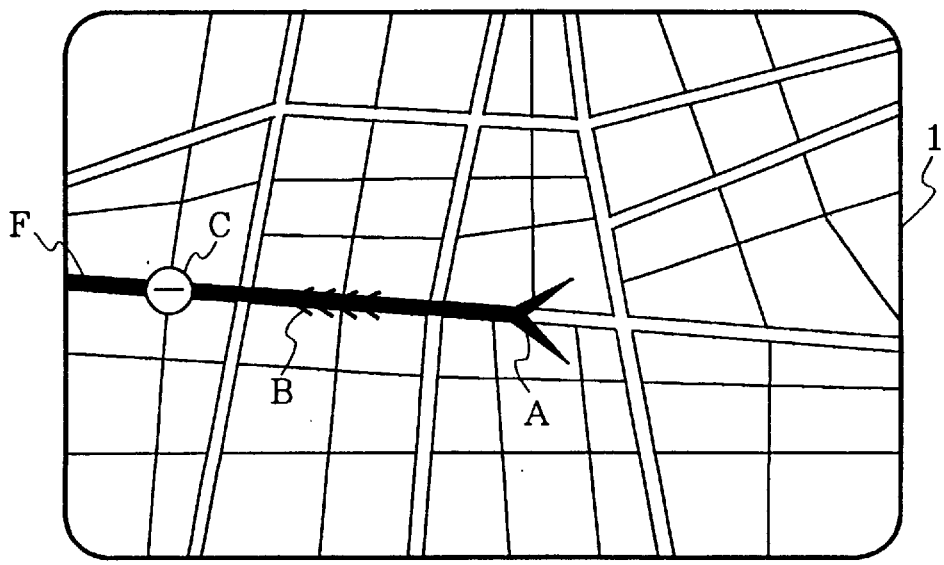
FIG. 30 is a view showing an example of a screen display by the prior art navigation device.

FIG. 25a shows an example of a display in the case where the scale of a map displayed on the screen of the display means 106 is equal to or larger than a scale of 50,000:1., and FIG. 25a shows an example of a display in the case where the scale of a map displayed on the screen of the display means 106 is smaller than a scale of 50,000:1. In the example shown in FIG. 25a, traffic-jam indicating lines J1 to J5 with a width of 3 dots are displayed in dark red together with expressways R1 with a width of 3 dots, national roads R2 with a width of 3 dots, prefectural roads R3 with a width of 3 dots, and other roads R4 with a width of 1 dot, which are displayed in different colors according to the types of the roads. On the contrary, in the example shown in FIG. 25b, traffic-jam indicating lines J1 to J7 with a width of 3 dots are displayed in ocher together with expressways R1 with a width of 3 dots, national roads R2 with a width of 3 dots, prefectural roads R3 with a width of 3 dots, and other roads R4 with a width of 1 dot, which are displayed in different colors according to the types of the roads.

As mentioned above, the device changes the colors of traffic-jam indicating lines J displayed on a road map on-screen to a quiet color when the scale of the on-screen road map is small. Therefore, even when the scale of an on-screen road map is small and a number of traffic-jam indicating lines J are needed to be displayed, such traffic-jam conditions and a road map can be recognized well at the same time with the visibility of the on-screen road map improved.

As previously explained, the present invention offers the following advantages.

A navigation device according to a preferred embodiment of the present invention is adapted to display traffic-jam indicating lines, which are based on traffic-jam information received by a traffic information receiving means, along roads in traffic jams on a map displayed on the screen of a display means, and change the display forms of roads on-screen when the number of links each including a congested road section is equal to or larger than a predetermined number, by provision of a display form controlling means. Thus, when the device receives a lot of information about traffic jams, the device changes the display forms of all roads in a road map on-screen so as to give them lesser prominence. Therefore, the device of the embodiment has an advantage in that even when it needs to display a number of traffic-jam indicating lines J, it can provide good visibility and a lot of information for the user.

A navigation device according to a preferred embodiment of the present invention is adapted to display traffic-jam indicating lines, which are based on traffic-jam information received by a traffic information receiving means, along roads in traffic jams on a map displayed on the screen of a display means, and change the display forms of the traffic-jam indicating lines on-screen when the number of links each including a congested road section is equal to or larger than a predetermined number, by provision of a display form controlling means. Thus, when the device receives a lot of information about traffic jams, the device changes the display forms of traffic-jam indicating lines on-screen so as to give them lesser prominence. Therefore, the device of the embodiment has an advantage in that even when it needs to display many pieces of traffic-jam information, it can provide good visibility and a lot of information for the user without preventing transmission of road map information to the user.

A navigation device according to a preferred embodiment of the present invention is adapted to display traffic-jam indicating lines, which are based on traffic-jam information received by a traffic information receiving means, along roads in traffic jams on a map displayed on the screen of a display means, and change the display forms of roads on-screen when the scale of the on-screen road map is smaller than a predetermined scale, by provision of a display form controlling means. Thus, when the scale of an on-screen road map is small, the device changes the display forms of all roads in a road map on-screen so as to give them lesser prominence. Therefore, the device of the embodiment has an advantage in that even when the scale of an on-screen road map is small, it can provide good visibility and a lot of information for the user.

A navigation device according to a preferred embodiment of the present invention is adapted to display traffic-jam indicating lines, which are based on traffic-jam information received by a traffic information receiving means, along roads in traffic jams on a map displayed on the screen of a display means, and change the display forms of the traffic-jam indicating lines on-screen when the scale of the on-screen road map is smaller than a predetermined scale, by provision of a display form controlling means. Thus, when the scale of an on-screen road map is small, the device changes the display forms of all traffic-jam indicating lines on a road map on-screen so as to give them lesser prominence. Therefore, the device of the embodiment has an advantage in that even when the scale of an on-screen road map is small, it can provide good visibility and a lot of information for the user without preventing transmission of road map information to the user.

A navigation device according to a preferred embodiment of the present invention is adapted to change the colors of all roads color-coded according to the types of the roads to an identical quiet color regardless of the types of the roads when the number of links each including a congested road section is equal to or larger than a predetermined number or the scale of an on-screen road map is smaller than a predetermined scale. Thus, when the display is complicated, the device makes it possible to give all roads on an on-screen road map lesser prominence. Therefore, the device of the embodiment has an advantage in that even when a number of traffic-jam indicating lines are needed to be displayed, such traffic-jam conditions can be recognized with the visibility improved.

A navigation device according to a preferred embodiment of the present invention is adapted to change the widths of all on-screen roads predetermined according to the types of the roads to an identical smaller width regardless of the types of the roads when the number of links each including a congested road section is equal to or larger than a predetermined number or the scale of an on-screen road map is smaller than a predetermined scale. Thus, when the display is complicated, the device makes it possible to give all roads on an on-screen road map lesser prominence. Therefore, the device of the embodiment has an advantage in that even when a number of traffic-jam indicating lines are needed to be displayed, such traffic-jam conditions can be recognized with the visibility improved.

A navigation device according to a preferred embodiment of the present invention is adapted to change the colors of roads in traffic jams on a map on-screen to the same color as the background of the map when the number of links each including a congested road section is equal to or larger than a predetermined number or the scale of an on-screen road map is smaller than a predetermined scale. Thus, when the display is complicated, the device makes it possible to make congested roads become invisible while keeping only traffic-jam indicating lines being displayed on a road map. Therefore, the device of the embodiment has an advantage in that even when a number of traffic-jam indicating lines are needed to be displayed, such traffic-jam conditions can be recognized with the visibility improved.

A navigation device according to a preferred embodiment of the present invention is adapted to reduce the width of on-screen traffic-jam indicating lines when the number of links each including a congested part is equal to or larger than a predetermined number or the scale of an on-screen road map is smaller than a predetermined scale. Thus, when the display is complicated, the device makes it possible to give traffic-jam indicating lines on-screen lesser prominence. Therefore, the device of the embodiment has an advantage in that even when a number of traffic-jam indicating lines are needed to be displayed, such traffic-jam conditions and a road map can be recognized well at the same time.

A navigation device according to a preferred embodiment of the present invention is adapted to change the color of on-screen traffic-jam indicating lines to a quiet color when the number of links each including a congested road section is equal to or larger than a predetermined number or the scale of an on-screen road map is smaller than a predetermined scale. Thus, when the display is complicated, the device makes it possible to give traffic-jam indicating lines on-screen lesser prominence. Therefore, the device of the embodiment has an advantage in that even when a number of traffic-jam indicating lines are needed to be displayed, such traffic-jam conditions and a road map can be recognized well at the same time.

Many widely different embodiments of the present invention may be constructed without departing from the spirit and scope of the present invention. It should be understood that the present invention is not limited to the specific embodiments described in the specification, except as defined in the appended claims.

What is claimed is:

1. A navigation device mounted on a vehicle, comprising:
   a map data storing means for storing data on a road map;
   a current position detecting means for detecting the current position of the vehicle and for outputting data of the current position of the vehicle in order to display a current position mark;
   a traffic information receiving means for receiving traffic information including traffic-jam information;
   a display means for displaying a road map of an area in which the vehicle is travelling based on said data on the road map, and displaying said current position mark based on said data of the current position of the vehicle; and
   a display form controlling means for determining roads in a traffic-jam based on said traffic information received in said receiving means, for displaying a traffic-jam indicating symbol along a road in a traffic jam on the road map displayed on said display means, and for changing display forms of either roads or traffic-jam indicating symbols on the road map on-screen when said display form controlling means determines from the traffic information received that a number of links each of which are respectively connecting two nodes such as intersections and includes a congested road section is equal to or more than a predetermined number.

2. The navigation device according to claim 1, wherein said display form controlling means changes the display forms of the roads displayed on the screen of said display means by changing colors of the roads color-coded into a plurality of colors according to types of the roads to an identical quiet color regardless of the types of the roads.

3. The navigation device according to claim 1, wherein said display form controlling means changes the display forms of the roads displayed on the screen of said display means by changing widths of the roads predetermined according to types of the roads to an identical smaller width regardless of the types of the roads.

4. The navigation device according to claim 1, wherein said display form controlling means changes the display forms of only congested roads displayed on the screen of said display means by changing colors of the congested roads on-screen predetermined according to types of the roads to an identical quiet color regardless of the types of the roads.

5. The navigation device according to claim 4, wherein the quiet color is the same as a background of the road map on-screen.

6. The navigation device according to claim 1, wherein said display form controlling means changes the display forms of the traffic-jam indicating symbols displayed on the screen of said display means by reducing a width of the traffic-jam indicating symbols on-screen.

7. The navigation device according to claim 1, wherein said display form controlling means changes the display forms of the traffic-jam indicating symbols displayed on the screen of said display means by changing a color of the traffic-jam indicating symbols on-screen to a quiet color.

8. The navigation device according to claim 7, wherein the quiet color is similar to a color of a background of the road map on-screen.

9. A navigation device mounted on a vehicle, comprising:
   a map data storing means for storing data on a road map;
   a current position detecting means for detecting the current position of the vehicle and for outputting data of the current position of the vehicle in order to display a current position mark;
   a traffic information receiving means for receiving traffic information including traffic-jam information;
   a display means for displaying a road map of an area in which the vehicle is travelling based on said data on the road map, and displaying said current position mark based on said data of the current position of the vehicle; and
   a display form controlling means for determining roads in a traffic-jam based on said traffic information received in said receiving means, for displaying a traffic-jam indicating symbol along a road in a traffic jam on the road map displayed on said display means, and for changing display forms of either roads or traffic-jam indicating symbols on the road map on-screen when a scale of the road map displayed on said display means is smaller than a predetermined scale.

10. The navigation device according to claim 9, wherein said display form controlling means changes the display forms of the roads displayed on the screen of said display means by changing colors of the roads color-coded into a plurality of colors according to types of the roads to an identical quiet color regardless of the types of the roads.

11. The navigation device according to claim 9, wherein said display form controlling means changes the display forms of the roads displayed on the screen of said display means by changing widths of the roads predetermined according to types of the roads to an identical smaller width regardless of the types of the roads.

12. The navigation device according to claim 9, wherein said display form controlling means changes the display forms of only congested roads displayed on the screen of said display means by changing colors of the congested roads on-screen predetermined according to types of the roads to an identical quiet color regardless of the types of the roads.

13. The navigation device according to claim 12, wherein the quiet color is the same as a background of the road map on-screen.

14. The navigation device according to claim 9, wherein said display form controlling means changes the display forms of the traffic-jam indicating symbols displayed on the screen of said display means by reducing a width of the traffic-jam indicating symbols on-screen.

15. The navigation device according to claim 9, wherein said display form controlling means changes the display forms of the traffic-jam indicating symbols displayed on the screen of said display means by changing a color of the traffic-jam indicating symbols on-screen to a quiet color.

16. The navigation device according to claim 15, wherein the quiet color is similar to a color of a background of the road map on-screen.

\* \* \* \* \*